(12) United States Patent
Ishibashi

(10) Patent No.: US 10,365,453 B2
(45) Date of Patent: Jul. 30, 2019

(54) OPTICAL DEVICE AND OPTICAL APPARATUS HAVING THE SAME

(71) Applicant: CANON KABUSHIKI KAISHA, Tokyo (JP)

(72) Inventor: Tomohiko Ishibashi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 15/637,937

(22) Filed: Jun. 29, 2017

(65) Prior Publication Data

US 2018/0003904 A1 Jan. 4, 2018

(30) Foreign Application Priority Data

Jul. 4, 2016 (JP) ................ 2016-132869

(51) Int. Cl.
| | |
|---|---|
| *G02B 9/04* | (2006.01) |
| *G02B 6/42* | (2006.01) |
| *F21V 8/00* | (2006.01) |
| *G02B 3/00* | (2006.01) |
| *G02B 6/02* | (2006.01) |
| *G02B 9/64* | (2006.01) |
| *G02B 13/00* | (2006.01) |

(52) U.S. Cl.
CPC ............. *G02B 9/04* (2013.01); *G02B 3/00* (2013.01); *G02B 6/0023* (2013.01); *G02B 6/0055* (2013.01); *G02B 6/4212* (2013.01); *G02B 6/02004* (2013.01); *G02B 6/02033* (2013.01); *G02B 9/64* (2013.01); *G02B 13/0045* (2013.01)

(58) Field of Classification Search
CPC .. G02B 6/4212; G02B 6/0055; G02B 6/0023; G02B 9/04; G02B 9/18; G02B 9/24; G02B 9/26; G02B 9/28; G02B 9/30; G02B 9/40; G02B 9/42; G02B 9/46; G02B 9/48; G02B 9/52; G02B 9/54; G02B 13/006

See application file for complete search history.

(56) References Cited

U.S. PATENT DOCUMENTS

| | | | | |
|---|---|---|---|---|
| 4,679,918 | A | * 7/1987 | Ace ................ | G02C 7/02 351/159.62 |
| 5,253,111 | A | * 10/1993 | Chiba .............. | G02B 3/00 351/159.01 |
| 2003/0086184 | A1 | * 5/2003 | Abe ................. | G02B 3/00 359/796 |
| 2016/0291289 | A1 | * 10/2016 | Ishibashi ......... | G02B 13/006 |

FOREIGN PATENT DOCUMENTS

| | | |
|---|---|---|
| JP | 6-166550 A | 6/1994 |
| JP | 2003-139914 A | 5/2003 |
| JP | 2003-140037 A | 5/2003 |
| JP | 2011-27862 A | 2/2011 |

* cited by examiner

*Primary Examiner* — Jordan M Schwartz
(74) *Attorney, Agent, or Firm* — Canon U.S.A. Inc., IP Division

(57) ABSTRACT

An optical device including first and second optical elements formed of mutually different materials, and a bonding member bonding the first and second optical elements to each other, wherein the following conditional expression is satisfied:

$$0.14 < \text{Log}(te/tc) \times \text{Log}(E1 \times E2/Ec^2) < 5.0$$

where tc is a thickness in an optical axis direction of the bonding member on an optical axis, te is a thickness in the optical axis direction of the bonding member in a maximum diameter of interfaces between the first and second optical elements and the bonding member, and E1, E2, and Ec are respective Young's moduli of the first and second optical elements and the bonding member.

9 Claims, 13 Drawing Sheets

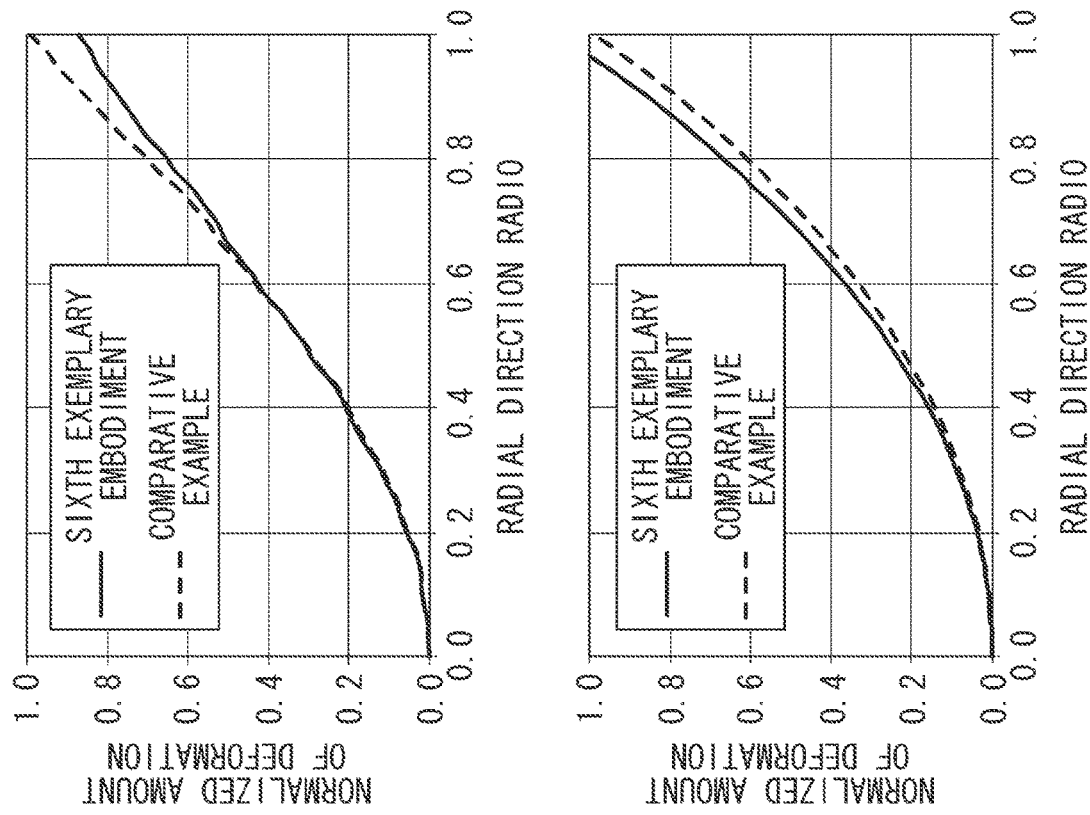
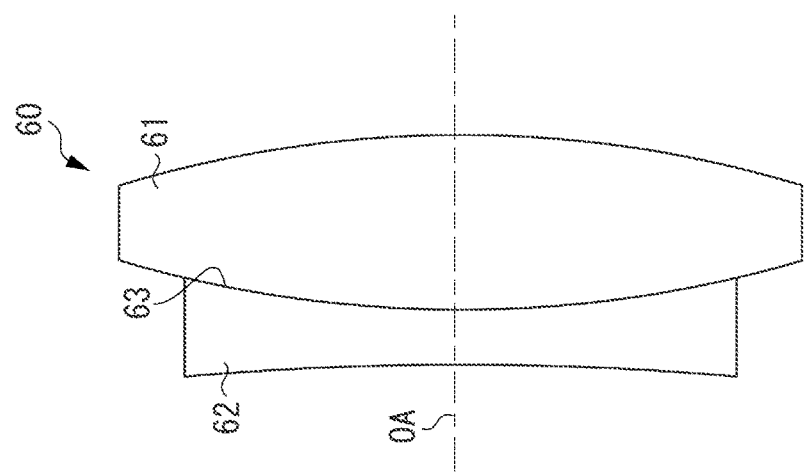
FIG. 7

OPTICAL DEVICE AND OPTICAL APPARATUS HAVING THE SAME

BACKGROUND OF THE INVENTION

Field of the Invention

The present disclosure relates to an optical device formed by a plurality of optical elements being bonded.

Description of the Related Art

An optical device constructed of a plurality of optical elements being bonded has been known. In Japanese Patent Application Laid-Open No. 2003-139914, an optical device constructed such that an adhesive has a desired uniform thickness by providing a spacer in an outer circumferential portion between two optical elements bonded by the adhesive is described. According to the optical device, even if linear expansion coefficients of the two optical elements are mutually different, deformation of each optical element and peeling of the adhesive due to environmental variations such as temperature changes can be inhibited.

However, in the optical device described in Japanese Patent Application Laid-Open No. 2003-139914, the adhesive and the spacer are mutually different in mechanical characteristics and thermal properties and also it is necessary to thicken the adhesive. Thus, the adhesive itself may be deformed due to environmental variations so that excellent optical performance may not be obtained.

SUMMARY OF THE INVENTION

The present disclosure is directed to implementing excellent environmental resistance of an optical device in which optical elements formed of mutually different materials are bonded.

According to an aspect of the present disclosure, an optical device includes first and second optical elements formed of mutually different materials and a bonding member bonding the first and second optical elements to each other, wherein the following conditional expression is satisfied:

$$0.14 < \text{Log}(te/tc) \times \text{Log}(E1 \times E2/Ec^2) < 5.0$$

where tc is a thickness in an optical axis direction of the bonding member on an optical axis, te is a thickness in the optical axis direction of the bonding member in a maximum diameter of interfaces between the first and second optical elements and the bonding member, and E1, E2, and Ec are respective Young's moduli of the first and second optical elements and the bonding member.

Further features of the present disclosure will become apparent from the following description of exemplary embodiments with reference to the attached drawings.

BRIEF DESCRIPTION OF THE DRAWINGS

FIG. 7 is a diagram illustrating a sectional view of principal units of an optical device according to a sixth exemplary embodiment and the amount of deformation of each optical surface.

DESCRIPTION OF THE EMBODIMENTS

Figure 1:
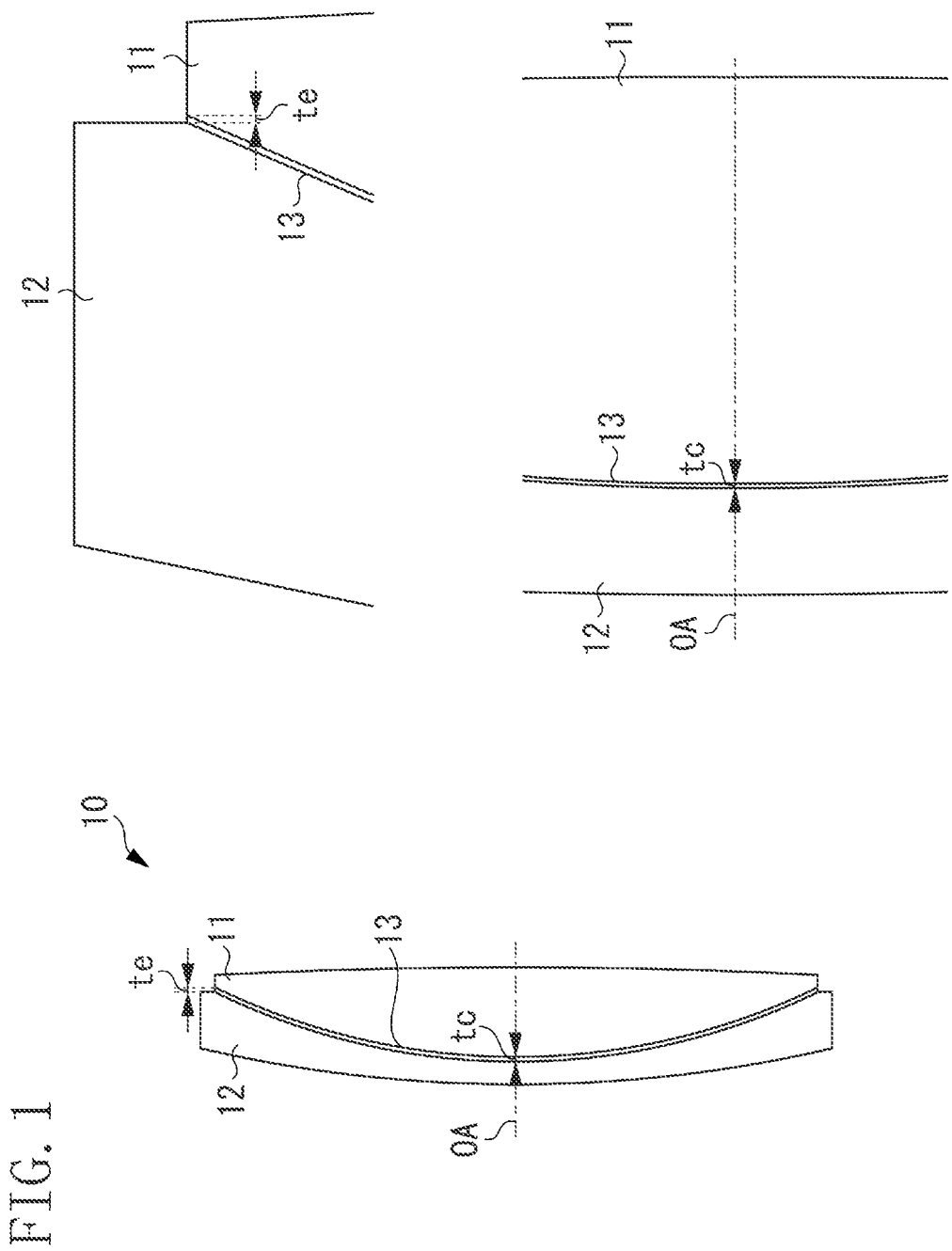
FIG. 1 is a sectional view of principal units of an optical device according to an exemplary embodiment.

Hereinafter, preferable exemplary embodiments of the present disclosure will be described with reference to the attached drawings. Each drawing may conveniently be depicted on a scale different from the actual scale. In each drawing, the same reference numerals are attached to the same members to omit duplicate descriptions.

FIG. 1 illustrates a schematic diagram of principal units (sectional view of principal units) in a cross section including an optical axis OA of an optical device 10 according to the present exemplary embodiment and a diagram enlarging a portion thereof. In FIG. 1, however, the scale of the thickness in an optical axis direction of a bonding member 13 described below is made larger than that of the thickness in the optical axis direction of other members.

The optical device 10 according to the present exemplary embodiment is constructed by two optical elements being bonded (integrated). Specifically, the optical device 10 includes a first optical element 11 and a second optical element 12 bonded to the first optical element 11 via the bonding member 13. The optical device 10 may be constructed of three optical elements or more if necessary as long as configured to include at least the first and second optical elements.

Here, it is assumed that the respective linear expansion coefficients of the first and second optical devices are α1 and α2, the thickness in the optical axis direction of the bonding member 13 on the optical axis OA is tc, and the thickness in the optical axis direction of the bonding member 13 in the maximum diameter of interfaces between the first and second optical devices and the bonding member 13 is te. In this case, the optical device implements excellent environmental resistance by satisfying the following conditional expressions (1) and (2):

$$\alpha 2 < \alpha 1 \quad (1)$$

$$0.14 < \text{Log}(te/tc) \times (\alpha 1/\alpha 2)^{0.5} < 6.0 \quad (2)$$

The optical device 10 according to the present exemplary embodiment will be described in detail below.

In the present exemplary embodiment, an optical element indicates an optical member having refractive power (refractive action) and a bonding member indicates a member (adhesive) to bond each optical element. If a bonding member has refractive power, the bonding member can also be considered as an optical element. On the other hand, a member having substantially no refractive power is not included as an optical element according to the present exemplary embodiment.

An optical element is formed from an inorganic material such as glass or an organic material such as plastic (resin). A bonding member is formed of an organic material such as a photo-setting (visible light setting or ultraviolet setting) resin or thermosetting resin. An organic material according to the present exemplary embodiment indicates a material having organic matter as its main component, that is, a material whose ratio of organic matter is the highest and also includes a mixture of a plurality of pieces of organic matter and organic matter in which inorganic particles are dispersed (organic complex).

As an inorganic material from which an optical element is formed, a crystalline material, inorganic glass, or ceramic can be adopted. As a crystalline material, for example, a cubic crystal such as calcium fluoride (fluorspar), barium fluoride, and lithium fluoride, a tetragonal crystal such as magnesium fluoride, and a hexagonal crystal such as synthetic quartz can be cited. As inorganic glass, for example, borosilicate glass, fluorophosphate glass, phosphate glass, fluorosilicate glass, and tellurite glass can be cited. As ceramic, for example, YAG, $Y_2O_3$, sapphire, Ba (Mg, Ta) O3-based material can be cited.

As a concrete example of the crystalline material, for example, fluorspar produced by Canon Optron. Inc. can be cited. As concrete examples of the inorganic glass, S-BSL7, S-FSL5, S-FPL51, 53, S-FPM2, S-LAH60, 66, S-TIH1, 10, S-TIH53, S-NBH52, 53, and S-TIM35 produced by Ohara Inc. can be cited. As a concrete example of the ceramic, for example, Lumicera produced by Murata Mfg. Co., Ltd. can be cited.

As an organic material from which an optical element is formed, thermoplastic resin such as general purpose plastic, engineering plastic, and super-engineering plastic or thermosetting resin can be adopted. As general purpose plastic, for example, polyethylene, polypropylene, polystyrene, polyvinyl carbazole, ABS resin, and acrylic resin can be cited. As engineering plastic, for example, polycarbonate and polyamide can be cited. As super-engineering plastic, for example, polyamide-imide can be cited. As thermosetting resin, for example, phenol resin, urea resin, melamine resin, and unsaturated polyester resin can be cited.

As an organic material used for a bonding member, photo-setting resin such as methacrylate, acrylate, and urethane acrylate or thermosetting resin such as epoxy resin can be adopted. As concrete examples of the bonding member formed of photo-setting resin, UT20, HR154, HV153, V300, and OPM55 produced by MS ADELL Co., Ltd. and TB3030, 3114, 3170D produced by ThreeBond Co., Ltd. can be cited. Further, LCR0628A produced by Toagosei Co., Ltd. and EP-001K and EP-160 produced by Cemedine Co., Ltd. can be cited. As concrete examples of the bonding member formed of thermosetting resin, TB3114 and TB3113B produced by ThreeBond Co., Ltd. and EP001K and EP160 produced by Cemedine Co., Ltd. can be cited.

In the present exemplary embodiment, a portion made of a continuous curved surface (a spherical surface of a constant curvature radius or an aspheric surface defined by the same definition expression) in each optical element is defined as an optical surface. The optical surface corresponds to, among optical elements, an area (effective surface) through which an effective light beam contributing to image formation in a use state passes. In the present exemplary embodiment, all optical surfaces of each optical element are mirror surfaces. That is, a surface that is not a mirror surface, to hold each optical element and an end surface in a direction (radial direction) perpendicular to the optical axis in the cross section including the optical axis are non-optical surfaces that are not included in optical surfaces.

The diameter of an optical element in the present exemplary embodiment indicates a distance (width) between both ends of each optical element in the radial direction in the cross section including the optical axis or the position of the end thereof. Then, the maximum diameter of an optical element including non-optical surfaces is called an outside diameter and the maximum diameter of optical surfaces is called an inside diameter or an effective diameter. Also, a bonding surface in the present exemplary embodiment indicates a surface (interface) in each optical element bonded to another optical element.

In the optical device 10 according to the present exemplary embodiment, excellent optical performance can be implemented by appropriately setting the shape and material of each optical element. According to the optical device 10, when compared with an optical device in which each optical element is arranged via the atmosphere (such as air) without being bonded, a portion of each optical element in contact with the atmosphere in the interface can be reduced. Therefore, the occurrence of ghosts and flares can be inhibited by reducing the reflectance in the interface. Also in the optical device 10, each optical element is bonded to each other and therefore, the reduction of optical performance due to relative positional shifts (eccentricity) between optical elements, or the like can be inhibited.

In general, however, if the linear expansion coefficients of optical elements are mutually different in an optical device in which the plurality of optical element is bonded, the optical device is more likely to be deformed due to environmental variations. For example, in a high-temperature or low-temperature environment in which the temperature of the atmosphere changes significantly relative to the ordinary temperature, the difference of expansion amounts or contraction amounts of optical elements becomes large and thus, each optical surface is deformed. In addition, thermal stress arises on the bonding surface between each optical element and a bonding member and thus, peeling or the like of each bonding surface may arise.

Therefore, the condition (1) shows a condition for a problem such as a change in shape due to temperature changes to occur. If the condition (1) is not satisfied, that is, the linear expansion coefficients of the first and second optical elements are mutually equal, thermal stress generated due to temperature changes is sufficiently small and a problem such as degradation of optical performance due to deformation of each optical element does not arise.

Here, the degree of change in shape of each optical element due to temperature changes is correlated with the configuration of each optical element and the bonding member and thermal properties (particularly, the linear expansion coefficient) of each optical element. Thus, in the present exemplary embodiment, improvements of environmental resistance of the optical device 10 are enabled by appropriately setting the shape of the bonding member 13 and the linear expansion coefficient of each optical element. Specifically, by configuring the optical device 10 such that the above condition (2) is satisfied, a thickness deviation ratio of the bonding member 13 is appropriately set according to the ratio of the linear expansion coefficients of the first and second optical elements. The thickness deviation ratio here indicates the value of the ratio of the thickness in the optical axis direction in the maximum diameter to the thickness in the optical axis direction on the optical axis OA of the bonding member 13.

In general, a stress generated in the bonding member takes the maximum value in its outer circumferential portion (maximum diameter). The effect of reducing the stress generated in the bonding member is correlated with a logarithm of the thickness deviation ratio of the bonding member. Thus, by setting the thickness deviation ratio of the bonding member 13 such that the condition (2) is satisfied, the stress generated in the outer circumferential portion of the bonding member 13 can be reduced so that changes in shape of each optical surface and peeling or the like of each bonding surface in a high or low temperature environment can be inhibited. If the value of the condition (2) falls below the lower limit thereof, the thickness deviation ratio of the bonding member 13 becomes small and it becomes difficult to sufficiently reduce the stress generated in the outer circumferential portion. If the value of the condition (2) exceeds the upper limit thereof, the thickness deviation ratio of the bonding member 13 becomes too large and a change in shape of each optical element arises due to deformation of the bonding member 13 itself.

Also in the optical device 10 according to the present exemplary embodiment, there is no need to provide a spacer like the optical device described in Japanese Patent Application Laid-Open No. 2003-139914 described above and thus, excellent environmental resistance can be obtained with a simple configuration. Then, in the optical device 10, there is no need to make the bonding member uniformly thick like the optical device described in Japanese Patent Application Laid-Open No. 2003-139914 and thus, the volume of the bonding member 13 can be made smaller. Therefore, when the optical device 10 is manufactured, expansion or contraction when the bonding member 13 is cured can be inhibited and changes in shape of each optical element can be reduced. Further, in a high-humidity environment, deformation of the optical surface of each optical element due to expansion or contraction caused by water absorption by the bonding member 13 can be inhibited.

The stress generated in the bonding member 13 increases with an increasing difference of the linear expansion coefficients of the first and second optical elements. For example, the linear expansion coefficient of an inorganic material (low-dispersion glass or the like) or organic material of low dispersion is particularly large when compared with a common inorganic material. Thus, in an optical device in which an inorganic material or organic material of low dispersion and a common inorganic material are bonded to reduce chromatic aberration, deformation of each optical surface and peeling or the like of each bonding surface due to environmental variations become pronounced.

That is, with an increasing difference of the linear expansion coefficients of the first and second optical elements, an effect of reducing the stress by satisfying the condition (2) increases. Thus, the optical device 10 according to the present exemplary embodiment particularly preferably satisfies the following conditional expressions (1a) to (1c) in order:

$$1.2 \leq \alpha 1/\alpha 2 \tag{1a}$$

$$1.3 \leq \alpha 1/\alpha 2 \tag{1b}$$

$$1.4 \leq \alpha 1/\alpha 2 \tag{1c}$$

Further, particularly preferably, the following conditional expressions (2a) to (2d) are satisfied in order:

$$0.16 \leq \mathrm{Log}(te/tc) \times (\alpha 1/\alpha 2)^{0.5} < 5.0 \tag{2a}$$

$$0.18 \leq \mathrm{Log}(te/tc) \times (\alpha 1/\alpha 2)^{0.5} < 4.0 \tag{2b}$$

$$0.20 \leq \mathrm{Log}(te/tc) \times (\alpha 1/\alpha 2)^{0.5} < 2.5 \tag{2c}$$

$$0.24 \leq \mathrm{Log}(te/tc) \times (\alpha 1/\alpha 2)^{0.5} < 1.5 \tag{2d}$$

Here, an inorganic material such as inorganic glass is preferably used as the material of the first and second optical elements according to the present exemplary embodiment. If the first and second optical elements are formed from an organic material, the organic material does not have sufficient mechanical strength, which makes it difficult to hold the optical device 10 by a holding member such as a lens-barrel. In addition, the organic material has a large linear expansion coefficient when compared with an inorganic material, which makes the optical surface of each optical element more likely to be deformed due to environmental variations. However, even if each optical element is formed from an organic material, the mechanical strength of the optical device 10 can be increased by bonding an optical element formed of an inorganic material to at least one optical element.

If the respective Young's moduli of the first and second optical elements and the bonding member 13 are E1, E2, and Ec, the optical device 10 according to the present exemplary embodiment preferably satisfies the following conditional expression (3). By satisfying the condition (3), the Young's modulus of the bonding member 13 becomes small when compared with the Young's moduli of the first and second optical elements and the stress generated in the bonding member 13 becomes small and therefore, changes in shape of each optical surface can be reduced. Accordingly, peeling and the like of the bonding surface of each optical element and the bonding member 13 can be inhibited so that changes of optical characteristics can be reduced.

$$1.0 < \mathrm{Log}(E1 \times E2/Ec^2) < 20 \tag{3}$$

If the value of the condition (3) falls below the lower limit thereof, rigidity of the bonding member 13 becomes too large and stress may not be sufficiently reducible even if the thickness deviation ratio of the bonding member 13 is increased. If the value of the condition (3) exceeds the upper limit thereof, rigidity of the bonding member 13 becomes too small and the bonding member 13 may be deformed by self-weight of each optical element or peeling of each bonding surface or cracks of the bonding member 13 may occur.

Further, particularly preferably, the following conditional expressions (3a) to (3e) are satisfied in order:

$$1.0 < \text{Log}(E1 \times E2/Ec^2) < 16 \tag{3a}$$

$$2.0 < \text{Log}(E1 \times E2/Ec^2) < 14 \tag{3b}$$

$$3.0 < \text{Log}(E1 \times E2/Ec^2) < 12 \tag{3c}$$

$$4.0 < \text{Log}(E1 \times E2/Ec^2) < 10 \tag{3d}$$

$$7.0 < \text{Log}(E1 \times E2/Ec^2) < 9.5 \tag{3e}$$

The optical device 10 according to the present exemplary embodiment preferably satisfies the following conditional expression (4). In the optical device 10, the effect of reducing the stress generated in the bonding member 13 is correlated with a logarithm of the value of the product of the ratio of the Young's modulus of the first optical element to the Young's modulus of the bonding member 13 and the ratio of the Young's modulus of the second optical element to the Young's modulus of the bonding member 13. Thus, by appropriately setting the thickness deviation ratio of the bonding member 13 and the value of the ratio of the Young's moduli such that the condition (4) is satisfied, the stress generated in the bonding member 13 can sufficiently be reduced.

$$0.14 < \text{Log}(te/tc) \times \text{Log}(E1 \times E2/Ec^2) < 25 \tag{4}$$

If the value of the condition (4) falls below the lower limit thereof, the thickness deviation ratio of the bonding member 13 becomes too small and it may become difficult to mitigate the influence of stress generated in the outer circumferential portion of each interface. If the value of the condition (4) exceeds the upper limit thereof, changes in shape of the bonding member 13 becomes too large and the bonding member 13 may be deformed by self-weight of each optical element or peeling of each bonding surface or cracks of the bonding member 13 may occur.

Further, particularly preferably, the following conditional expressions (4a) to (4d) are satisfied in order:

$$0.25 < \text{Log}(te/tc) \times \text{Log}(E1 \times E2/Ec^2) < 20 \tag{4a}$$

$$0.35 < \text{Log}(te/tc) \times \text{Log}(E1 \times E2/Ec^2) < 15 \tag{4b}$$

$$1.0 < \text{Log}(te/tc) \times \text{Log}(E1 \times E2/Ec^2) < 10 \tag{4c}$$

$$1.5 < \text{Log}(te/tc) \times \text{Log}(E1 \times E2/Ec^2) < 5.0 \tag{4d}$$

If the refractive power of the first and second optical elements and the bonding member 13 is $\phi 1$, $\phi 2$, and $\phi c$, the following conditional expressions (5) and (6) are desirably satisfied:

$$-6.0 < \text{Log}|\phi c/\phi 1| < -0.30 \tag{5}$$

$$-6.0 < \text{Log}|\phi c/\phi 2| < -0.30 \tag{6}$$

If the value of the condition (5) or the condition (6) falls below the lower limit thereof, the thickness deviation ratio of the bonding member 13 becomes too small and it may become difficult to mitigate the influence of stress generated in the outer circumferential portion of each interface. If the value of the condition (5) or the condition (6) exceeds the upper limit thereof, the thickness deviation ratio of the bonding member 13 becomes too large and thus, deformation of the bonding member 13 itself becomes large and the first and second optical members may be deformed.

Further, particularly preferably, the following conditional expressions (5a), (6a) to (5d), and (6d) are satisfied in order:

$$-5.0 < \text{Log}|\phi c/\phi 1| < -0.60 \tag{5a}$$

$$-5.0 < \text{Log}|\phi c/\phi 2| < -0.60 \tag{6a}$$

$$-4.4 < \text{Log}|\phi c/\phi 1| < -0.80 \tag{5b}$$

$$-4.4 < \text{Log}|\phi c/\phi 2| < -0.80 \tag{6b}$$

$$-3.8 < \text{Log}|\phi c/\phi 1| < -1.0 \tag{5c}$$

$$-3.8 < \text{Log}|\phi c/\phi 2| < -1.0 \tag{6c}$$

$$-3.5 < \text{Log}|\phi c/\phi 1| < -1.2 \tag{5d}$$

$$-3.5 < \text{Log}|\phi c/\phi 2| < -1.2 \tag{6d}$$

If the average of the curvature radii of the interfaces between the first and second optical elements and the bonding member 13 (the average of the curvature radii of the bonding member 13) is Rc and the maximum diameter of the interfaces between the first and second optical elements and the bonding member 13 is Dc, the following conditional expression (7) is desirably satisfied:

$$1.3 < te/tc/\{1 - 0.6(Dc/2Rc)^2\} < 40 \tag{7}$$

If the curvature radii of the interfaces between the first and second optical elements and the bonding member 13 are mutually equal, the thickness in a spherical center direction of the bonding member 13 decreases with an increasing open angle of each interface. Here, the open angle indicates an angle formed by a straight line connecting the center of curvature (spherical center) of each interface and the position of the maximum diameter of each interface and the optical axis OA. The thickness in the spherical center direction indicates a distance from the center of curvature of each interface to the position of the maximum diameter of each interface.

Specifically, the amount of decrease in thickness in the spherical center direction of the bonding member 13 increases in proportion to the square of the open angle and thus, if optical surfaces with a large open angle are bonded, the stress generated in the outer circumferential portion of the bonding member 13 tends to increase. Thus, by appropriately setting the thickness deviation ratio of the bonding member 13 and the open angle of each interface such that the condition (7) described above is satisfied, the stress generated in the bonding member 13 can sufficiently be reduced.

If the value of the condition (7) falls below the lower limit thereof, the amount of decrease in thickness in the spherical center direction of the bonding member 13 based on the open angle of each interface becomes too large for the thickness deviation ratio of the bonding member 13 and it may become difficult to sufficiently reduce the stress generated in the outer circumferential portion of the bonding member 13. If the value of the condition (7) exceeds the upper limit thereof, the thickness deviation ratio of the bonding member 13 becomes too large and thus, deformation of the bonding member 13 itself becomes large and the first and second optical members may be deformed.

Further, particularly preferably, the following conditional expressions (7a) to (7d) are satisfied in order:

$$1.4 < te/tc/\{1 - 0.6(Dc/2Rc)^2\} < 30 \tag{7a}$$

$$1.5 < te/tc/\{1 - 0.6(Dc/2Rc)^2\} < 25 \tag{7b}$$

$$2.0 < te/tc/\{1 - 0.6(Dc/2Rc)^2\} < 20 \tag{7c}$$

$$2.5 < te/tc/\{1 - 0.6(Dc/2Rc)^2\} < 15 \tag{7d}$$

If the linear expansion coefficient of the bonding member 13 is αc, the linear expansion coefficients and Young's moduli of the first and second optical elements and the bonding member 13 preferably satisfy the following conditional expressions (8) to (13). The unit of the linear expansion coefficient is [1×10$^{-7}$/° C.] and the unit of the Young's modulus is [GPa].

$$40 < \alpha 1 < 20 \times 10^2 \quad (8)$$

$$40 < \alpha 2 < 2.6 \times 10^2 \quad (9)$$

$$4.0 \times 10^2 < \alpha c < 32 \times 10^2 \quad (10)$$

$$0.60 < E1 < 3.0 \times 10^2 \quad (11)$$

$$48 < E2 < 3.0 \times 10^2 \quad (12)$$

$$1.0 \times 10^{-3} < Ec < 12 \quad (13)$$

The respective thicknesses on the optical axis OA and in the maximum diameter of the bonding member 13 preferably satisfy the following conditional expressions (14) and (15). The unit of the thickness is [mm].

$$1.0 \times 10^{-3} < tc < 8.0 \times 10^{-2} \quad (14)$$

$$1.0 \times 10^{-3} < te < 0.20 \quad (15)$$

Further, if the refractive index and the Abbe number for a d line of each optical element are ndl and vdl respectively and the refractive index for a d line of the bonding member 13 is ndc, the following conditional expressions (16) to (18) are preferably satisfied:

$$1.4 < ndl < 2.3 \quad (16)$$

$$7.0 < vdl < 1.0 \times 10^2 \quad (17)$$

$$1.4 < ndc < 1.8 \quad (18)$$

By selecting the shape and materials of each optical element and the bonding member 13 such that at least one of the conditions (8) to (18) is satisfied while the conditions (1) and (2) described above are satisfied, excellent optical performance and environmental resistance can be implemented in the optical device 10. Further, particularly preferably, at least one of the following conditional expressions (8a) to (15a) is satisfied:

$$95 < \alpha 1 < 7.5 \times 10^2 \quad (8a)$$

$$50 < \alpha 2 < 1.1 \times 10^2 \quad (9a)$$

$$6.3 \times 10^2 < \alpha c < 11 \times 10^2 \quad (10a)$$

$$2.0 < E1 < 97 \quad (11a)$$

$$65 < E2 < 1.0 \times 10^2 \quad (12a)$$

$$2.5 \times 10 - 3 < Ec < 9.2 \quad (13a)$$

$$2.8 \times 10^{-3} < tc < 4.3 \times 10^{-2} \quad (14a)$$

$$7.6 \times 10^{-3} < te < 0.15 \quad (15a)$$

According to the optical device 10 in the present exemplary embodiment, as described above, excellent environmental resistance can be implemented in a configuration in which a plurality of optical elements is bonded. Next, exemplary embodiments of the optical device 10 will be described in detail. Various values of the optical device according to each example and values of the formula in the middle of each condition are listed in Table 1 and Table 2 shown below.

Figure 2:
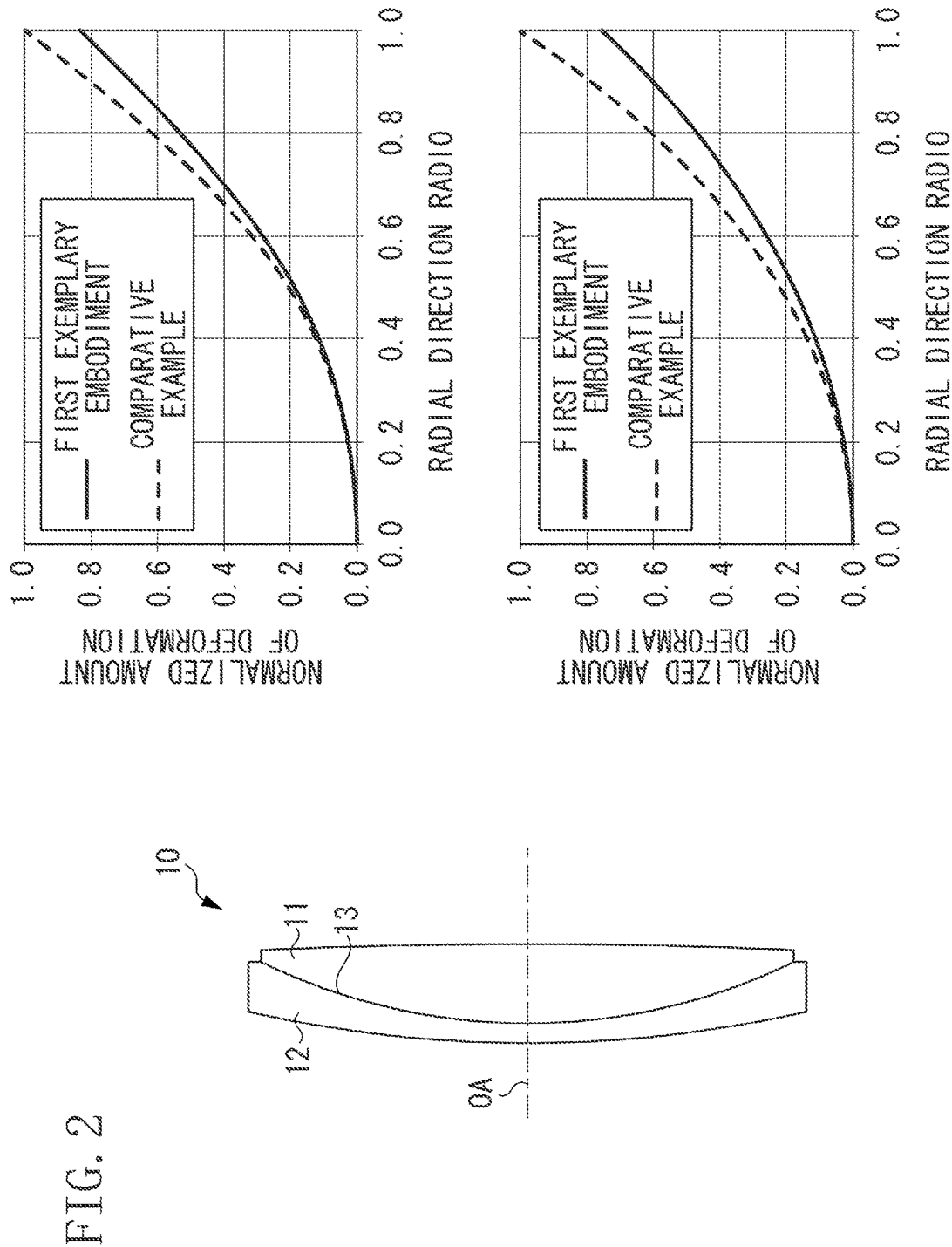
FIG. 2 is a diagram illustrating a sectional view of principal units of an optical device according to a first exemplary embodiment and the amount of deformation of each optical surface.

FIG. 2 illustrates a sectional view of principal units of the optical device 10 according to a first exemplary embodiment and the degree of change in shape when the temperature of the optical device 10 changes (details will be described below). The configuration of the optical device 10 according to the present exemplary embodiment is similar to the configuration of the above embodiment. In FIG. 2, however, in contrast to FIG. 1, the scale of the thickness in the optical axis direction of the bonding member 13 is made equal to that of the thickness in the optical axis direction of other members.

In the present exemplary embodiment, the first optical element 11 is an optical element in convex shapes on both sides, made of S-FPL51 produced by Ohara Inc. as inorganic glass and having positive refractive power. The second optical element 12 is an optical element in a meniscus shape, made of S-LAH60 produced by Ohara Inc. as inorganic glass and having negative refractive power. One side of the optical surfaces of each of the first and second optical elements is exposed to the atmosphere. The bonding member 13 is made of LCR0628A produced by Toagosei Co., Ltd. as a photo-setting adhesive and has negative refractive power.

The first optical element 11 is made of low-dispersion glass having a large linear expansion coefficient when compared with the second optical element 12 and thus, the condition (1) is satisfied. The thickness in the optical axis direction of the bonding member 13 on the optical axis OA is 0.010 mm and the thickness in the optical axis direction of the bonding member 13 in the maximum diameter of the interface is 0.020 mm and thus, the condition (2) is satisfied. Accordingly, the stress generated in the bonding member 13 due to temperature changes can be reduced and changes in shape of each optical surface can be inhibited.

Here, an optical device according to Comparative Example is considered to describe the effect of the optical device 10 according to the present exemplary embodiment. The optical device according to Comparative Example is configured similarly to the optical device 10 according to the present exemplary embodiment except that the curvature radii of interfaces between the first and second optical elements and the bonding member are mutually equal and there is no thickness deviation of the bonding member (the thickness deviation ratio is 1). It is assumed that the thickness in the optical direction on the optical axis of the bonding member according to Comparative Example is equal to the thickness in the optical direction on the optical axis of the bonding member 13 according to the present exemplary embodiment.

FIG. 2 illustrates the degree of change in shape (amount of deformation) of each of the optical surface exposed to the atmosphere of the second optical element 12 and the optical surface exposed to the atmosphere of the first optical element 11 when the temperature changes. Here, the finite element method is used to show a calculation result of the amount of deformation in the optical axis direction generated when a temperature rise of 40° C. occurs. In FIG. 2, a solid line indicates the first exemplary embodiment, a broken line indicates Comparative Example, the vertical axis shows a normalized amount of deformation normalized by setting the maximum amount of deformation of the optical surface according to Comparative Example as 1.0, and the horizontal axis shows a radial direction ratio normalized by setting the effective diameter of the optical surface as 1.0.

As illustrated in FIG. 2, the maximum value of the normalized amount of deformation of the optical surface of the second optical element 12 is about 17% less in the first exemplary embodiment than in Comparative Example. Also, the maximum value of the normalized amount of deformation of the optical surface of the first optical element 11 is about 25% less in the first exemplary embodiment than in Comparative Example.

Then, as a result of calculating the stress generated in the outer circumferential portion of the bonding surfaces between the first and second optical elements and the bonding member 13, it became clear that the stress is 40% less in the present exemplary embodiment than in Comparative Example. Therefore, the optical device 10 according to the present exemplary embodiment implements environmental resistance superior to that of the optical device according to Comparative Example.

Figure 3:
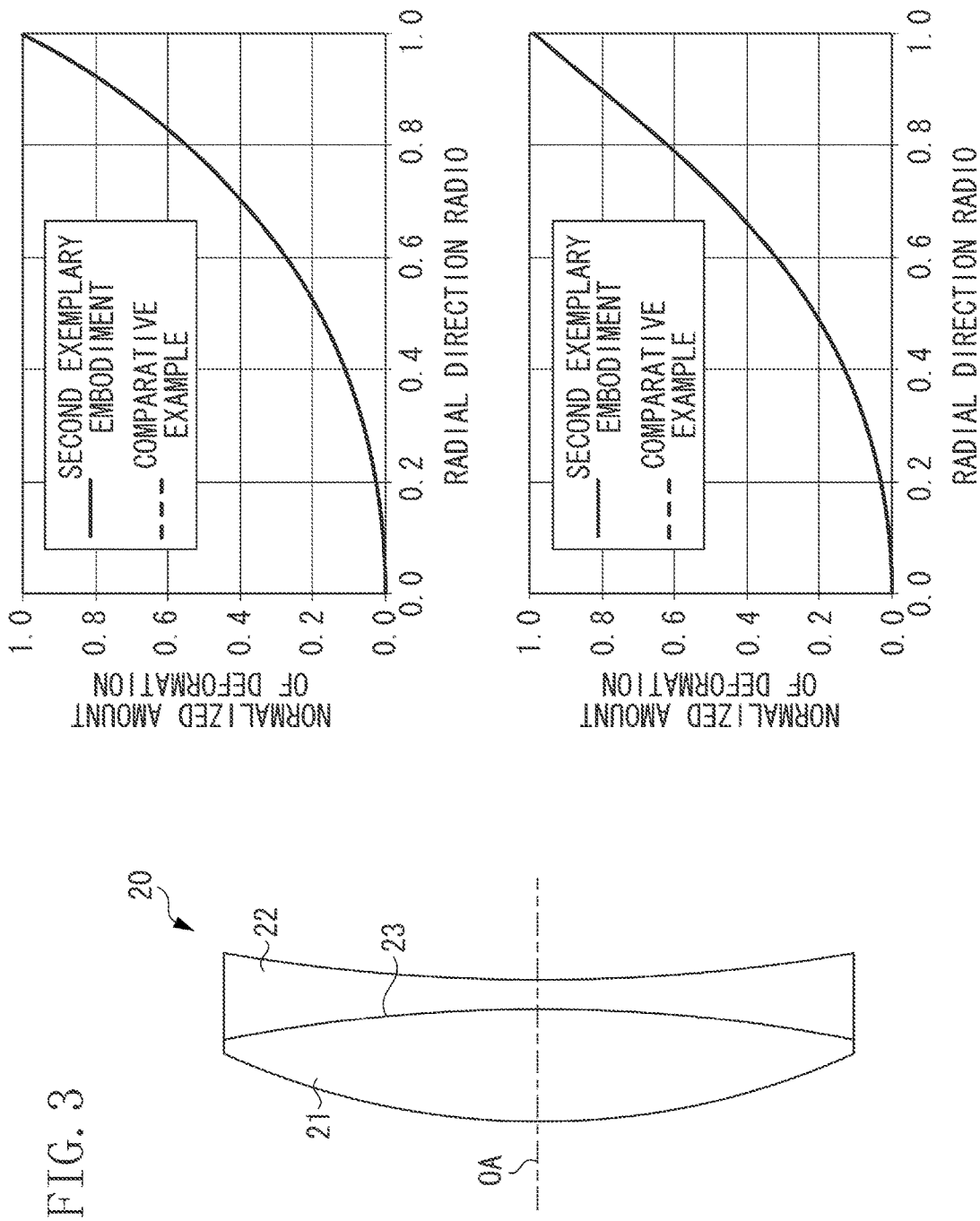
FIG. 3 is a diagram illustrating a sectional view of principal units of an optical device according to a second exemplary embodiment and the amount of deformation of each optical surface.

FIG. 3 illustrates a sectional view of principal units of an optical device 20 according to a second exemplary embodiment and the amount of deformation of each optical surface when the temperature changes. The optical device 20 according to the present exemplary embodiment is constructed, like the optical device 10 according to the first exemplary embodiment, by bonding two optical elements, but the material and shape of each optical element are different from those of the optical device 10.

In the present exemplary embodiment, a first optical element 21 is an optical element in convex shapes on both sides, made of S-FPL51 produced by Ohara Inc. and having positive refractive power. A second optical element 22 is an optical element in concave shapes on both sides, made of S-LAH66 produced by Ohara Inc. and having negative refractive power. A bonding member 23 is made of TB3114 produced by ThreeBond Co., Ltd. as a photo-setting adhesive and has negative refractive power.

Like in the first exemplary embodiment, the first optical element 21 is made of low-dispersion glass having a large linear expansion coefficient when compared with the second optical element 22 and thus, the condition (1) is satisfied. The thickness in the optical axis direction of the bonding member 23 on the optical axis OA is 0.020 mm and the thickness in the optical axis direction of the bonding member 23 in the maximum diameter of the interface is 0.030 mm and thus, the condition (2) is satisfied.

Here, like in the first exemplary embodiment, an optical device according to Comparative Example configured similarly to the optical device 20 according to the present exemplary embodiment except that the curvature radii of interfaces between the first and second optical elements and the bonding member are mutually equal is considered. FIG. 3 illustrates the relationship between the normalized amount of deformation and the radial direction ratio of each of the optical surface exposed to the atmosphere of the first optical element 21 and the optical surface exposed to the atmosphere of the second optical element 22 when the temperature changes.

As illustrated in FIG. 3, the maximum value of the normalized amount of deformation of the optical surface of each of the first and second optical elements is approximately the same as that of Comparative Example. On the other hand, as a result of calculating the stress generated in the outer circumferential portion of the bonding surfaces between the first and second optical elements and the bonding member 23 by performing a simulation, it became clear that the stress is 4.9% less in the present exemplary embodiment than in Comparative Example. Therefore, the optical device 20 according to the present exemplary embodiment implements environmental resistance superior to that of the optical device according to Comparative Example.

Figure 4:
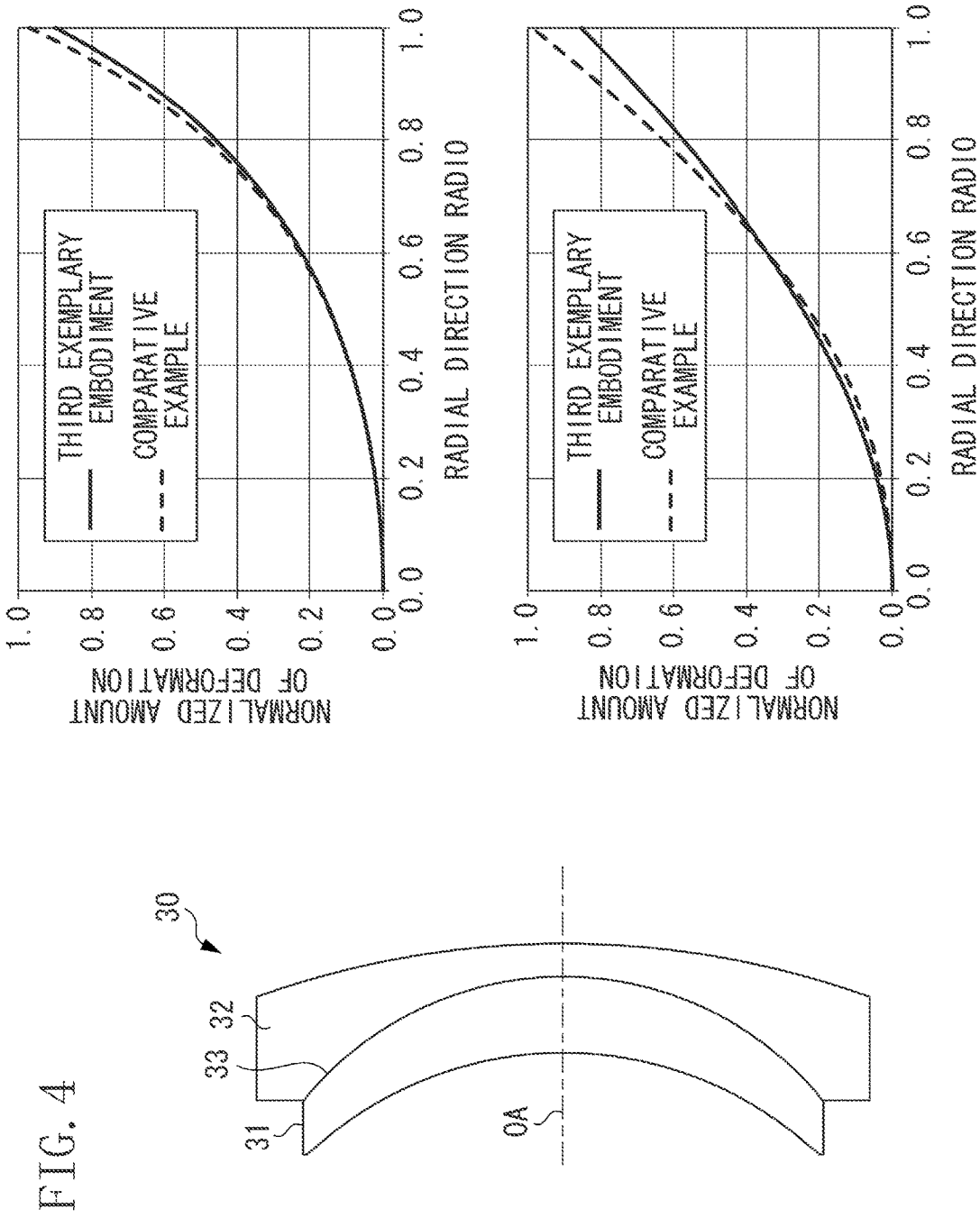
FIG. 4 is a diagram illustrating a sectional view of principal units of an optical device according to a third exemplary embodiment and the amount of deformation of each optical surface.

FIG. 4 illustrates a sectional view of principal units of an optical device 30 according to a third exemplary embodiment and the amount of deformation when the temperature of each optical surface changes. The optical device 30 according to the present exemplary embodiment is constructed, like the optical device 10 according to the first exemplary embodiment, by bonding two optical elements, but the material and shape of each optical element are different from those of the optical device 10.

In the present exemplary embodiment, a first optical element 31 is an optical element in a meniscus shape, made of S-FPL53 produced by Ohara Inc. and having positive refractive power. A second optical element 32 is an optical element in a meniscus shape, made of S-TIH53 produced by Ohara Inc. and having negative refractive power. A bonding member 33 is made of LCR0628A produced by Toagosei Co., Ltd. as a photo-setting adhesive and has negative refractive power.

Like in the first exemplary embodiment, the first optical element 31 is made of low-dispersion glass having a large linear expansion coefficient when compared with the second optical element 32 and thus, the condition (1) is satisfied. The thickness in the optical axis direction of the bonding member 33 on the optical axis OA is 0.015 mm and the thickness in the optical axis direction of the bonding member 33 in the maximum diameter of the interface is 0.060 mm and thus, the condition (2) is satisfied.

Here, like in the first exemplary embodiment, an optical device according to Comparative Example configured similarly to the optical device 30 according to the present exemplary embodiment except that the curvature radii of interfaces between the first and second optical elements and the bonding member are mutually equal is considered. FIG. 4 illustrates the relationship between the normalized amount of deformation and the radial direction ratio of each of the optical surface exposed to the atmosphere of the first optical element 31 and the optical surface exposed to the atmosphere of the second optical element 32 when the temperature changes.

As illustrated in FIG. 4, the maximum value of the normalized amount of deformation of the optical surface of the first optical element 31 is about 8% less in the third exemplary embodiment than in Comparative Example. Also, the maximum value of the normalized amount of deformation of the optical surface of the second optical element 32 is about 14% less in the third exemplary embodiment than in Comparative Example. Then, as a result of calculating the stress generated in the outer circumferential portion of the bonding surfaces between the first and second optical elements and the bonding member 33 by performing a simulation, it became clear that the stress is about 74% less in the present exemplary embodiment than in Comparative Example. Therefore, the optical device 30 according to the present exemplary embodiment implements environmental resistance superior to that of the optical device according to Comparative Example.

Figure 5:
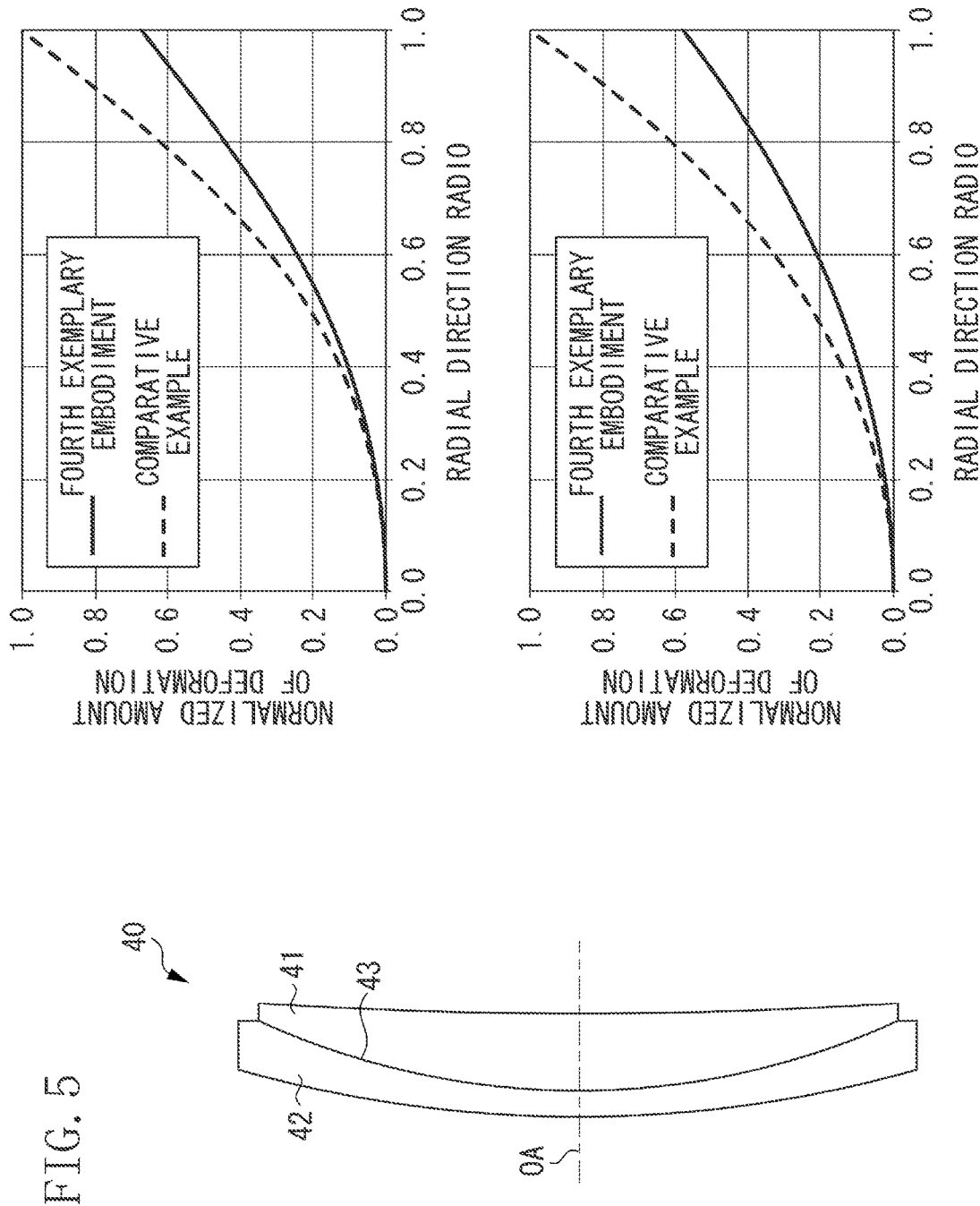
FIG. 5 is a diagram illustrating a sectional view of principal units of an optical device according to a fourth exemplary embodiment and the amount of deformation of each optical surface.

FIG. 5 illustrates a sectional view of principal units of an optical device 40 according to a fourth exemplary embodiment and the amount of deformation of each optical surface when the temperature changes. The optical device 40 according to the present exemplary embodiment is constructed, like the optical device 10 according to the first exemplary embodiment, by bonding two optical elements, but the material and shape of each optical element are different from those of the optical device 10.

In the present exemplary embodiment, a first optical element 41 is an optical element in a meniscus shape, made of fluorspar produced by Canon Optron. Inc. and having positive refractive power. A second optical element 42 is an optical element in a meniscus shape, made of S-TIH10 produced by Ohara Inc. and having negative refractive power. A bonding member 43 is made of EP-001K produced by Cemedine Co., Ltd. as a photo-setting adhesive and has negative refractive power.

The first optical element 41 is made of low-dispersion organic material having a large linear expansion coefficient when compared with the second optical element 42 and thus, the condition (1) is satisfied. The thickness in the optical axis direction of the bonding member 43 on the optical axis OA is 0.0050 mm and the thickness in the optical axis direction of the bonding member 43 in the maximum diameter of the interface is 0.015 mm and thus, the condition (2) is satisfied.

Here, like in the first exemplary embodiment, an optical device according to Comparative Example configured similarly to the optical device 40 according to the present exemplary embodiment except that the curvature radii of interfaces between the first and second optical elements and the bonding member are mutually equal is considered. FIG. 5 illustrates the relationship between the normalized amount of deformation and the radial direction ratio of each of the optical surface exposed to the atmosphere of the second optical element 42 and the optical surface exposed to the atmosphere of the first optical element 41 when the temperature changes.

As illustrated in FIG. 5, the maximum value of the normalized amount of deformation of the optical surface of the second optical element 42 is about 33% less in the fourth exemplary embodiment than in Comparative Example. Also, the maximum value of the normalized amount of deformation of the optical surface of the first optical element 41 is about 42% less in the fourth exemplary embodiment than in Comparative Example. Then, as a result of calculating the stress generated in the outer circumferential portion of the bonding surfaces between the first and second optical elements and the bonding member 43 by performing a simulation, it became clear that the stress is about 60% less in the present exemplary embodiment than in Comparative Example. Therefore, the optical device 40 according to the present exemplary embodiment implements environmental resistance superior to that of the optical device according to Comparative Example.

Figure 6:
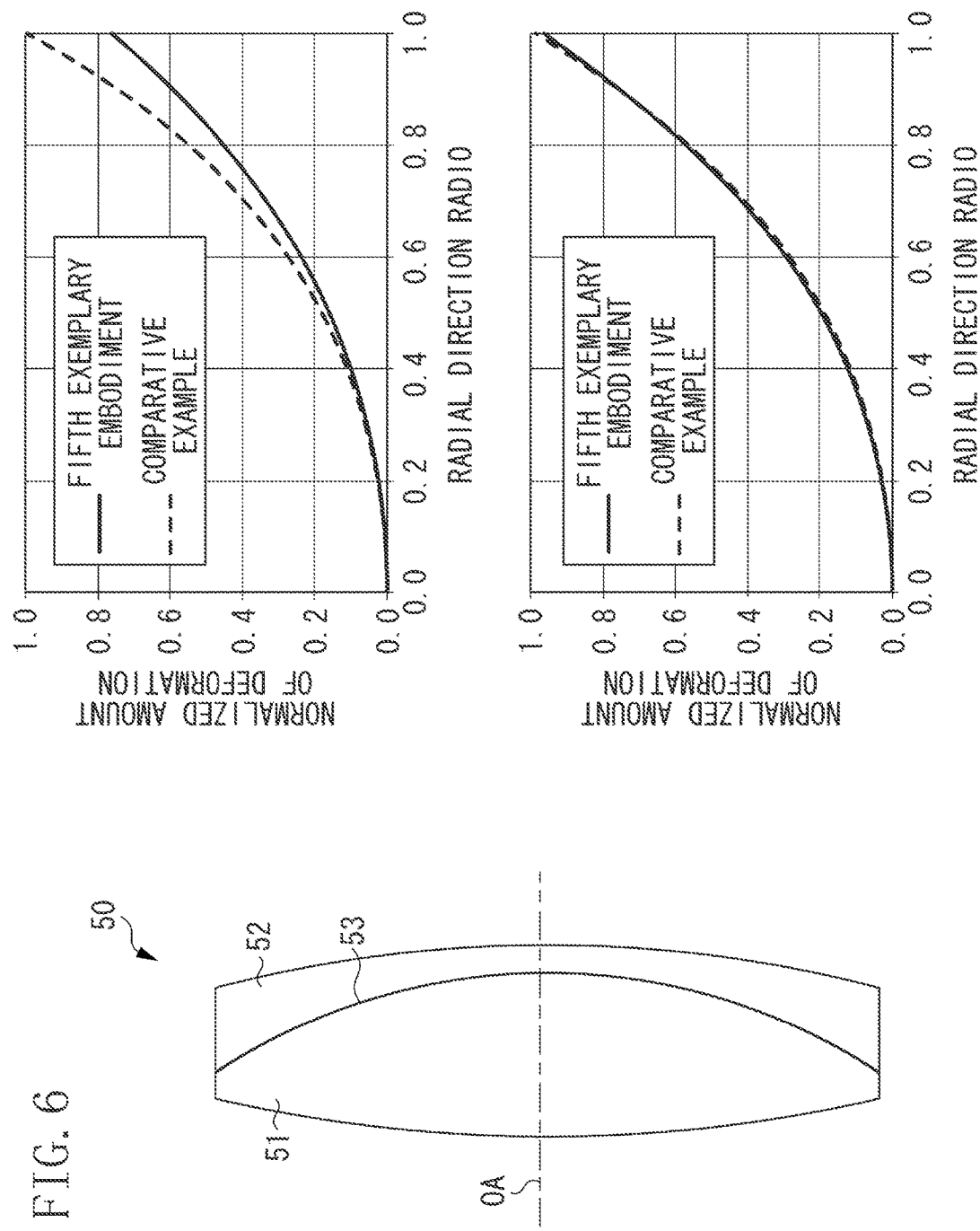
FIG. 6 is a diagram illustrating a sectional view of principal units of an optical device according to a fifth exemplary embodiment and the amount of deformation of each optical surface.

FIG. 6 illustrates a sectional view of principal units of an optical device 50 according to a fifth exemplary embodiment and the amount of deformation of each optical surface when the temperature changes. The optical device 50 according to the present exemplary embodiment is constructed, like the optical device 10 according to the first exemplary embodiment, by bonding two optical elements, but the material and shape of each optical element are different from those of the optical device 10.

In the present exemplary embodiment, a first optical element 51 is an optical element in concave shapes on both sides, made of S-FPM2 produced by Ohara Inc. and having positive refractive power. A second optical element 52 is an optical element in a meniscus shape, made of S-NBH53 produced by Ohara Inc. and having negative refractive power. A bonding member 53 is made of EP-160 produced by Cemedine Co., Ltd. as a photo-setting adhesive and has negative refractive power.

Like in the first exemplary embodiment, the first optical element 51 is made of low-dispersion glass having a large linear expansion coefficient when compared with the second optical element 52 and thus, the condition (1) is satisfied. The thickness in the optical axis direction of the bonding member 53 on the optical axis OA is 0.010 mm and the thickness in the optical axis direction of the bonding member 53 in the maximum diameter of the interface is 0.10 mm and thus, the condition (2) is satisfied.

Here, like in the first exemplary embodiment, an optical device according to Comparative Example configured similarly to the optical device 50 according to the present exemplary embodiment except that the curvature radii of interfaces between the first and second optical elements and the bonding member are mutually equal is considered. FIG. 6 illustrates the relationship between the normalized amount of deformation and the radial direction ratio of each of the optical surface exposed to the atmosphere of the first optical element 51 and the optical surface exposed to the atmosphere of the second optical element 52 when the temperature changes.

As illustrated in FIG. 6, the maximum value of the normalized amount of deformation of the optical surface of the first optical element 51 is about 24% less in the fifth exemplary embodiment than in Comparative Example. Also, the maximum value of the normalized amount of deformation of the optical surface of the second optical element 52 is about 2% less in the fifth exemplary embodiment than in Comparative Example. Then, as a result of calculating the stress generated in the outer circumferential portion of the bonding surfaces between the first and second optical elements and the bonding member 53 by performing a simulation, it became clear that the stress is about 61% less in the present exemplary embodiment than in Comparative Example. Therefore, the optical device 50 according to the present exemplary embodiment implements environmental resistance superior to that of the optical device according to Comparative Example.

FIG. 7 illustrates a sectional view of principal units of an optical device 60 according to a sixth exemplary embodiment and the amount of deformation of each optical surface when the temperature changes. The optical device 60 according to the present exemplary embodiment is constructed, like the optical device 10 according to the first exemplary embodiment, by bonding two optical elements, but the material and shape of each optical element are different from those of the optical device 10.

In the present exemplary embodiment, a first optical element 61 is an optical element in convex shapes on both sides, made of S-FPL51 produced by Ohara Inc. and having positive refractive power. A second optical element 62 is an optical element in concave shapes on both sides, made of S-TIH53 produced by Ohara Inc. and having negative refractive power. A bonding member 63 is made of LCR0628A produced by Toagosei Co., Ltd. as a photo-setting adhesive and has negative refractive power.

Like in the first exemplary embodiment, the first optical element 61 is made of low-dispersion glass having a large linear expansion coefficient when compared with the second optical element 62 and thus, the condition (1) is satisfied. The thickness in the optical axis direction of the bonding member 63 on the optical axis OA is 0.0050 mm and the thickness in the optical axis direction of the bonding member 63 in the maximum diameter of the interface is 0.010 mm and thus, the condition (2) is satisfied.

Here, like in the first exemplary embodiment, an optical device according to Comparative Example configured similarly to the optical device 60 according to the present exemplary embodiment except that the curvature radii of interfaces between the first and second optical elements and the bonding member are mutually equal is considered. FIG. 7 illustrates the relationship between the normalized amount of deformation and the radial direction ratio of each of the optical surface exposed to the atmosphere of the second optical element 62 and the optical surface exposed to the atmosphere of the first optical element 61 when the temperature changes.

As illustrated in FIG. 7, the maximum value of the normalized amount of deformation of the optical surface of the second optical element 62 is about 12% less in the sixth exemplary embodiment than in Comparative Example. On the other hand, the maximum value of the normalized amount of deformation of the optical surface of the first optical element 61 is about 9% more in the sixth exemplary embodiment than in Comparative Example. However, the effect of reducing the amount of deformation of the optical surface of the second optical element 62 is sufficiently large and thus, the optical device 60 as a whole can sufficiently reduce changes in shape.

Then, as a result of calculating the stress generated in the outer circumferential portion of the bonding surfaces between the first and second optical elements and the bonding member 63 by performing a simulation, it became clear that the stress is about 50% less in the present exemplary embodiment than in Comparative Example. Therefore, the optical device 60 according to the present exemplary embodiment implements environmental resistance superior to that of the optical device according to Comparative Example.

Figure 8:
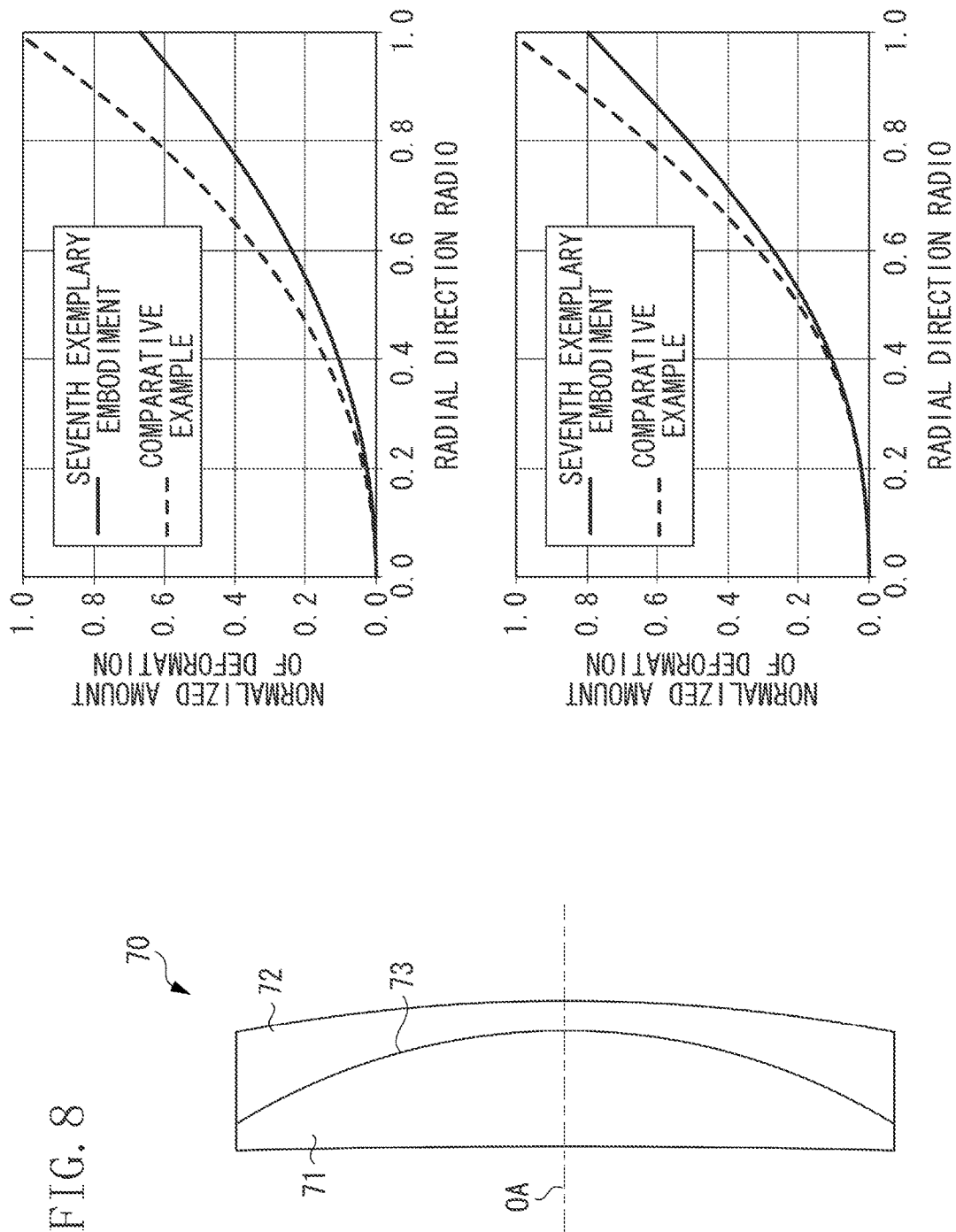
FIG. 8 is a diagram illustrating a sectional view of principal units of an optical device according to a seventh exemplary embodiment and the amount of deformation of each optical surface.

FIG. 8 illustrates a sectional view of principal units of an optical device 70 according to a seventh exemplary embodiment and the amount of deformation of each optical surface when the temperature changes. The optical device 70 according to the present exemplary embodiment is constructed, like the optical device 10 according to the first exemplary embodiment, by bonding two optical elements, but the material and shape of each optical element are different from those of the optical device 10.

In the present exemplary embodiment, a first optical element 71 is an optical element in a meniscus shape, made of fluorspar produced by Canon Optron. Inc. and having positive refractive power. A second optical element 72 is an optical element in a meniscus shape, made of S-NBH52 produced by Ohara Inc. and having negative refractive power. A bonding member 73 is made of LCR0628A produced by Toagosei Co., Ltd. as a photo-setting adhesive and has negative refractive power.

The first optical element 71 is made of low-dispersion inorganic material having a large linear expansion coefficient when compared with the second optical element 72 and thus, the condition (1) is satisfied. The thickness in the optical axis direction of the bonding member 73 on the optical axis OA is 0.0080 mm and the thickness in the optical axis direction of the bonding member 73 in the maximum diameter of the interface is 0.020 mm and thus, the condition (2) is satisfied.

Here, like in the first exemplary embodiment, an optical device according to Comparative Example configured similarly to the optical device 70 according to the present exemplary embodiment except that the curvature radii of interfaces between the first and second optical elements and the bonding member are mutually equal is considered. FIG. 8 illustrates the relationship between the normalized amount of deformation and the radial direction ratio of each of the optical surface exposed to the atmosphere of the first optical element 71 and the optical surface exposed to the atmosphere of the second optical element 72 when the temperature changes.

As illustrated in FIG. 8, the maximum value of the normalized amount of deformation of the optical surface of the first optical element 71 is about 34% less in the seventh exemplary embodiment than in Comparative Example. Also, the maximum value of the normalized amount of deformation of the optical surface of the second optical element 72 is about 21% less in the seventh exemplary embodiment than in Comparative Example. Then, as a result of calculating the stress generated in the outer circumferential portion of the bonding surfaces between the first and second optical elements and the bonding member 73 by performing a simulation, it became clear that the stress is about 51% less in the present exemplary embodiment than in Comparative Example. Therefore, the optical device 70 according to the present exemplary embodiment implements environmental resistance superior to that of the optical device according to Comparative Example.

Figure 9:
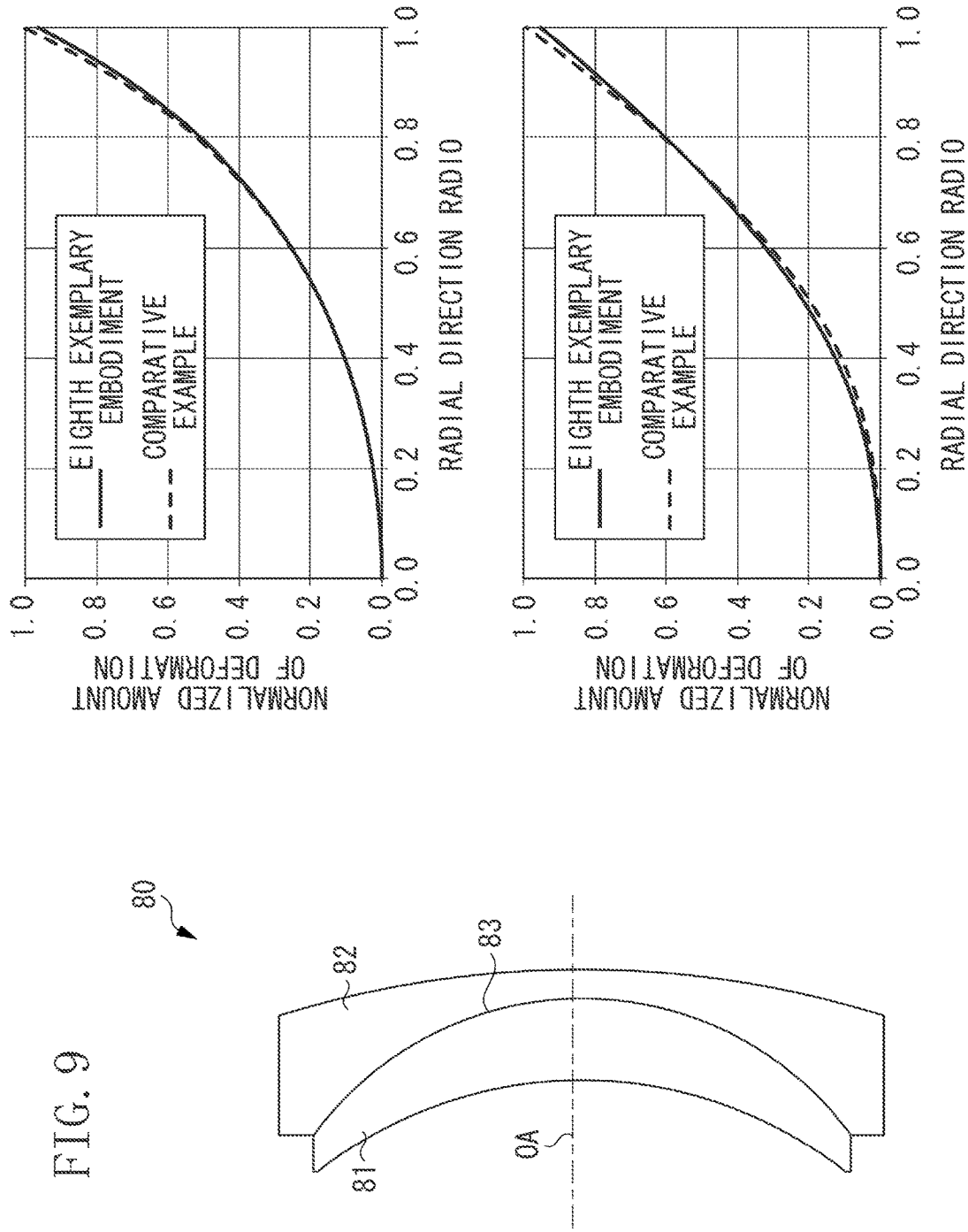
FIG. 9 is a diagram illustrating a sectional view of principal units of an optical device according to an eighth exemplary embodiment and the amount of deformation of each optical surface.

FIG. 9 illustrates a sectional view of principal units of an optical device 80 according to an eighth exemplary embodiment and the amount of deformation of each optical surface when the temperature changes. The optical device 80 according to the present exemplary embodiment is constructed, like the optical device 10 according to the first exemplary embodiment, by bonding two optical elements, but the material and shape of each optical element are different from those of the optical device 10.

In the present exemplary embodiment, a first optical element 81 is an optical element in a meniscus shape, made of S-FPL51 produced by Ohara Inc. and having positive refractive power. A second optical element 82 is an optical element in a meniscus shape, made of S-TIM35 produced by Ohara Inc. and having negative refractive power. A bonding member 83 is made of LCR0628A produced by Toagosei Co., Ltd. as a photo-setting adhesive and has negative refractive power.

Like in the first exemplary embodiment, the first optical element 81 is made of low-dispersion glass having a large linear expansion coefficient when compared with the second optical element 82 and thus, the condition (1) is satisfied. The thickness in the optical axis direction of the bonding member 83 on the optical axis OA is 0.016 mm and the thickness in the optical axis direction of the bonding member 83 in the maximum diameter of the interface is 0.025 mm and thus, the condition (2) is satisfied.

Here, like in the first exemplary embodiment, an optical device according to Comparative Example configured similarly to the optical device 80 according to the present exemplary embodiment except that the curvature radii of interfaces between the first and second optical elements and the bonding member are mutually equal is considered. FIG. 9 illustrates the relationship between the normalized amount of deformation and the radial direction ratio of each of the optical surface exposed to the atmosphere of the first optical element 81 and the optical surface exposed to the atmosphere of the second optical element 82 when the temperature changes.

As illustrated in FIG. 9, the maximum value of the normalized amount of deformation of the optical surface of the first optical element 81 is about 4% less in the eighth exemplary embodiment than in Comparative Example. Also, the maximum value of the normalized amount of deformation of the optical surface of the second optical element 82 is about 4% less in the eighth exemplary embodiment than in Comparative Example. Then, as a result of calculating the stress generated in the outer circumferential portion of the bonding surfaces between the first and second optical elements and the bonding member 83 by performing a simulation, it became clear that the stress is about 35% less in the present exemplary embodiment than in Comparative Example. Therefore, the optical device 80 according to the present exemplary embodiment implements environmental resistance superior to that of the optical device according to Comparative Example.

Figure 10:
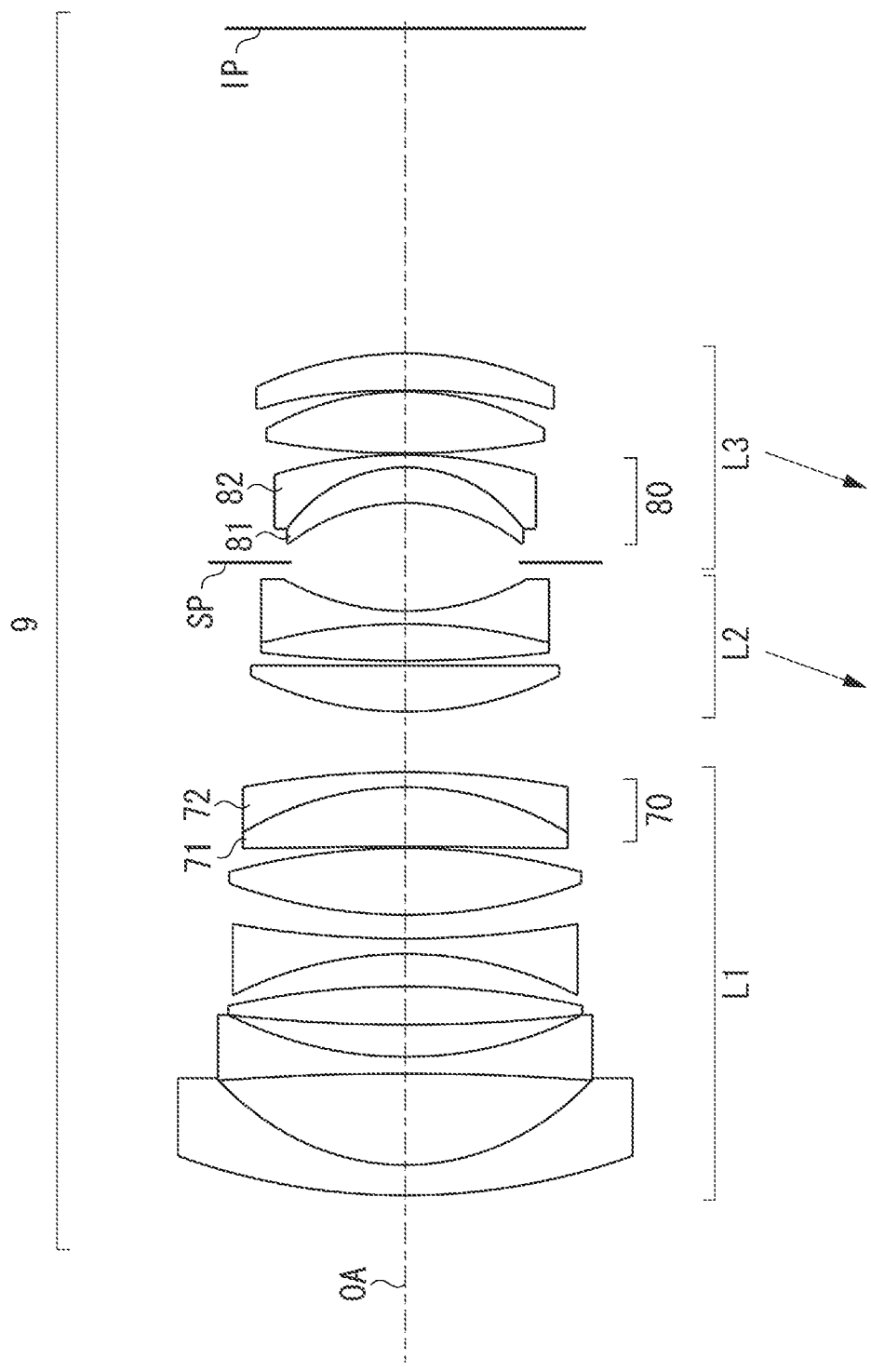
FIG. 10 is a sectional view in an in-focus state to an infinite-distant object of an optical system according to a ninth exemplary embodiment.
Figure 11:
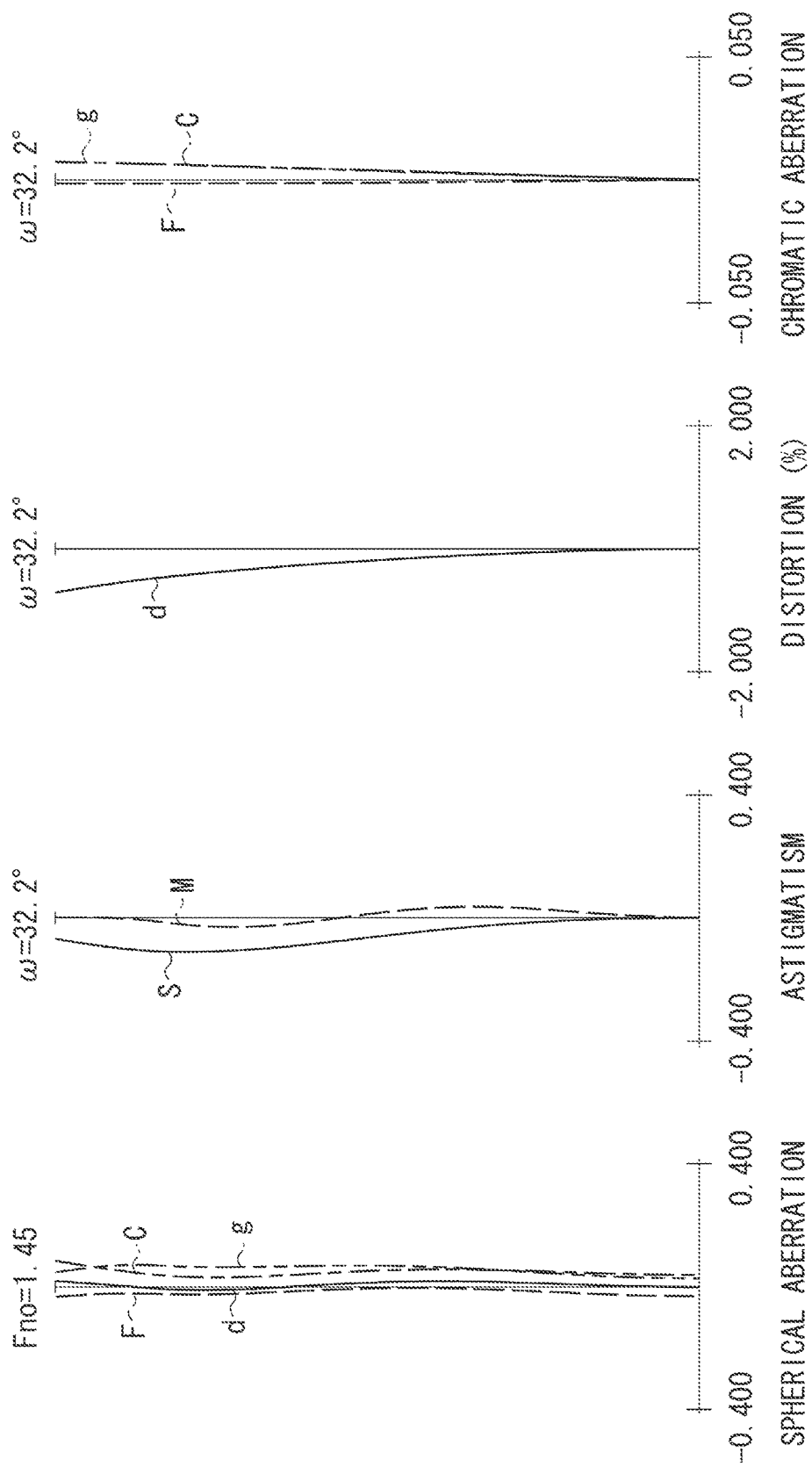
FIG. 11 is an aberration diagram in the in-focus state to the infinite-distant object of the optical system according to the ninth exemplary embodiment.

A ninth exemplary embodiment will be described. FIG. 10 is a sectional view of principal units of an optical system 9 including the optical device 70 according to the seventh exemplary embodiment and the optical device 80 according to the eighth exemplary embodiment. In FIG. 10, IP indicates an image plane, SP indicates an aperture stop, and an arrow indicates a moving locus of each lens unit in an optical axis direction when focused from infinity to a short distance. FIG. 11 is an aberration diagram when the optical system 9 focuses on an infinite-distance object and in FIG. 11, Fno indicates an F number of the optical system 9 and ω indicates a viewing angle of the optical system 9. Further, d, g, C, and F indicate each aberration of a d line, a g line, a C line, and an F line, and S and M indicate astigmatism of sagittal light and meridional light of a d line.

The optical system 9 according to the present exemplary embodiment is constructed of a first lens unit (lens group) L1 having positive refractive power, a second lens unit L2 having positive refractive power, and a third lens unit L3 having positive refractive power arranged in this order from the object side to the image side. The first lens unit L1 includes the optical device 70 and the third lens unit L3 includes the aperture stop SP and the optical device 80. In the optical system 9, the interval between neighboring lens units changes during focusing.

The first optical element 71 made of fluorspar produced by Canon Optron. Inc. and the optical element 81 made of S-FPL51 produced by Ohara Inc. have anomalous partial dispersibility and a partial dispersion ratio θgF regarding a g line and an F line of each is larger than that of common glass materials. By adopting optical elements having such anomalous partial dispersibility, the optical system 9 corrects axial chromatic aberration and lateral chromatic aberration satisfactorily.

The optical system 9 according to the present exemplary embodiment is a coaxial system in which the center of curvature of each optical surface and the center position of the image plane IP are arranged on the optical axis OA, but the optical system 9 may be made a non-coaxial system if necessary. Also, the optical system 9 according to the present exemplary embodiment adopts a configuration including one unit of the optical device 70 and one unit of the optical device 80, but the present exemplary embodiment is not limited to such a configuration and only needs to have a configuration including at least one optical device satisfying the conditions (1) and (2).

Figure 12:
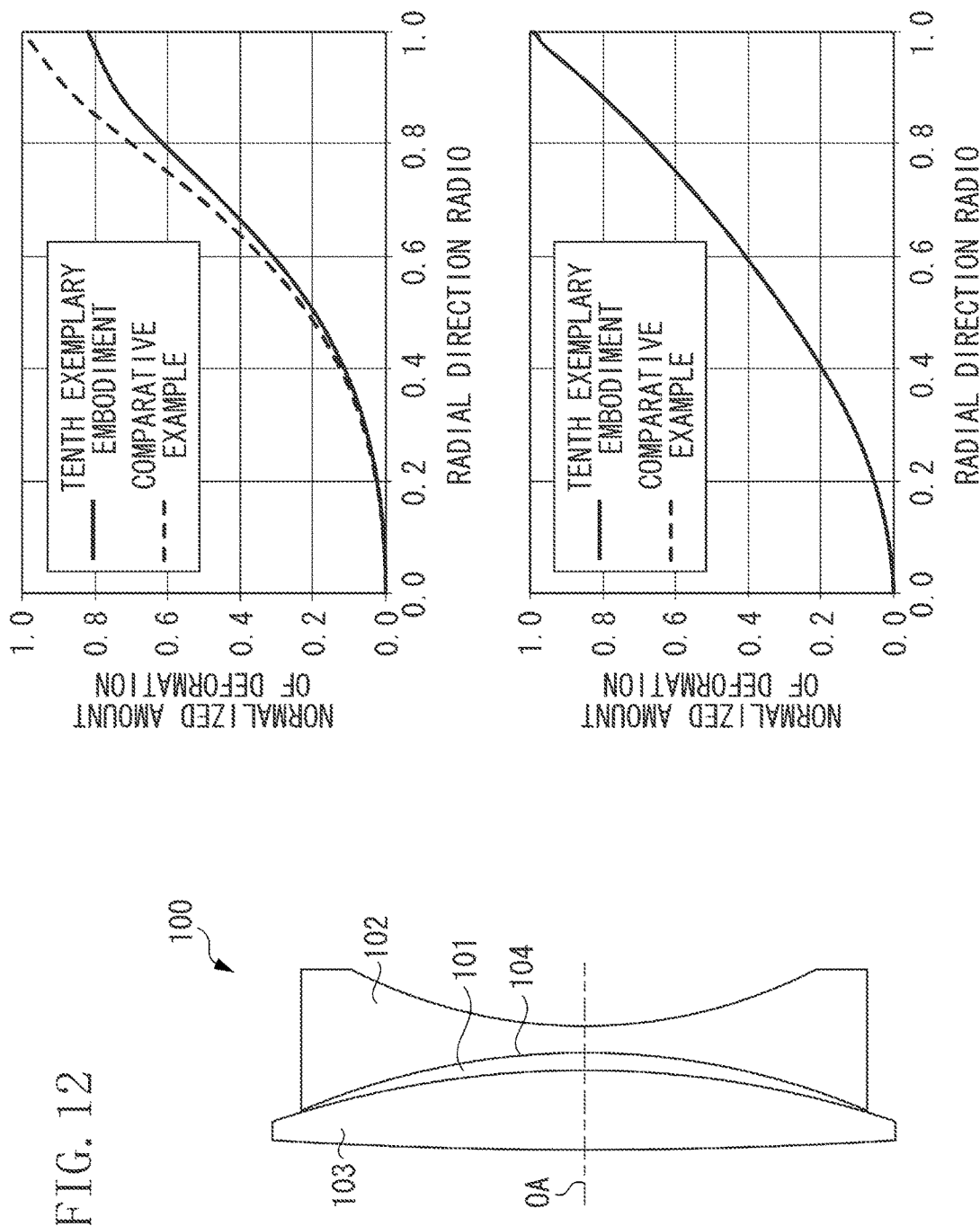
FIG. 12 is a diagram illustrating a sectional view of principal units of an optical device according to a tenth exemplary embodiment and the amount of deformation of each optical surface.

FIG. 12 illustrates a sectional view of principal units of an optical device 100 according to a tenth exemplary embodiment and the amount of deformation of each optical surface when the temperature changes. In contrast to the optical device according to each exemplary embodiment described above, the optical device 100 according to the tenth exemplary embodiment is configured by three optical elements being combined.

In the present exemplary embodiment, a first optical element 101 is an optical element in a meniscus shape, made of (meth)acrylic compound and having positive refractive power. A second optical element 102 is an optical element in concave shapes on both sides, made of S-TIH1 produced by Ohara Inc. and having negative refractive power. A third optical element 103 is an optical element in convex shapes on both sides, made of S-BSM14 produced by Ohara Inc. and having positive refractive power. A bonding member 104 is made of EP-160 produced by Cemedine Co., Ltd. as a photo-setting adhesive and has negative refractive power. In the present exemplary embodiment, the first optical element 101 and the second optical element 102 are bonded by the bonding member 104.

The optical device 100 according to the present exemplary embodiment is manufactured by a process of forming the second and third optical elements, a process of forming the first optical element 101 on the optical surface of the third optical element 103, and a process of bonding the optical surfaces of the first and second optical elements by the bonding member 104. However, the manufacturing method of the optical device 100 is not limited to the above method and the second optical element 102 may be formed after the first optical element 101 being formed on the optical surface of the third optical element 103 in advance. Alternatively, a method by which, after the first optical element 101 being formed in advance, each of the second and third optical elements and the first optical element 101 are bonded by a bonding member may be adopted.

In contract to the other exemplary embodiments described above, the first optical element 101 according to the present exemplary embodiment is made of resin and when compared with the second optical element 102 made of common inorganic glass, resin has a large linear expansion coefficient and thus, also the optical device 100 according to the present exemplary embodiment satisfies the condition (1). The thickness in the optical axis direction of the bonding member 104 on the optical axis OA is 0.010 mm and the thickness in the optical axis direction of the bonding member 104 in the maximum diameter of the interface is 0.050 mm and thus, the condition (2) is satisfied.

Here, like in the first exemplary embodiment, an optical device according to Comparative Example configured similarly to the optical device 100 according to the present exemplary embodiment except that the curvature radii of interfaces between the first and second optical elements and the bonding member are mutually equal is considered. FIG. 12 illustrates the relationship between the normalized amount of deformation and the radial direction ratio of each of the optical surface exposed to the atmosphere of the third optical element 103 and the optical surface exposed to the atmosphere of the second optical element 102 when the temperature changes.

As illustrated in FIG. 12, the maximum value of the normalized amount of deformation of the optical surface of the third optical element 103 is about 18% less in the tenth exemplary embodiment than in Comparative Example. On the other hand, the maximum value of the normalized amount of deformation of the optical surface of the second optical element 102 is approximately equal in the tenth exemplary embodiment and Comparative Example. Then, as a result of calculating the stress generated in the outer circumferential portion of the bonding surfaces between the first and second optical elements and the bonding member 104 by performing a simulation, it became clear that the stress is about 13% less in the present exemplary embodiment than in Comparative Example. Therefore, the optical device 100 according to the present exemplary embodiment implements environmental resistance superior to that of the optical device according to Comparative Example.

Table 1 lists various values of the optical device according to each of the above exemplary embodiments and values of the formula in the middle of the conditions (2) to (7).

aspheric surface shape. "e±XX" in each aspheric coefficient means "×10$^{\pm XX}$". If the amount of displacement from a surface vertex in the optical axis direction is X, the height from the optical axis in a direction perpendicular to the optical axis direction is h, the paraxial curvature radius is r, the conic constant is k, and aspheric coefficients are B, C, D, E, . . . , the aspheric surface shape of an optical surface is represented by the following formula (20):

TABLE 1

|  | First exemplary embodiment | Second exemplary embodiment | Third exemplary embodiment | Fourth exemplary embodiment | Fifth exemplary embodiment | Sixth exemplary embodiment | Seventh exemplary embodiment | Eighth exemplary embodiment | Tenth exemplary embodiment |
|---|---|---|---|---|---|---|---|---|---|
| α1 [1E−07/° C.] | 131 | 131 | 145 | 240 | 117 | 131 | 240 | 131 | 720 |
| α2 [1E−07/° C.] | 56 | 62 | 88 | 80 | 69 | 88 | 86 | 75 | 82 |
| α1/α2 | 2.339 | 2.113 | 1.648 | 3.000 | 1.696 | 1.489 | 2.791 | 1.747 | 8.780 |
| E1 [GPa] | 72.7 | 72.7 | 69.1 | 75.8 | 75.7 | 72.7 | 75.8 | 72.7 | 4.3 |
| E2 [GPa] | 124.8 | 121.9 | 96.0 | 102.4 | 103.1 | 96.0 | 97.9 | 87.5 | 88.4 |
| Ec [GPa] | 0.010 | 7.900 | 0.010 | 0.003 | 0.414 | 0.010 | 0.010 | 0.010 | 0.414 |
| tc [mm] | 0.010 | 0.020 | 0.015 | 0.005 | 0.010 | 0.005 | 0.008 | 0.016 | 0.010 |
| te [mm] | 0.020 | 0.030 | 0.060 | 0.015 | 0.100 | 0.010 | 0.020 | 0.025 | 0.050 |
| Log(te/tc) × (α1/α2)0.5 | 0.460 | 0.256 | 0.773 | 0.826 | 1.302 | 0.367 | 0.665 | 0.256 | 2.071 |
| Log(E1 × E2/Ec2) | 7.958 | 2.152 | 7.822 | 8.936 | 4.658 | 7.844 | 7.870 | 7.804 | 3.346 |
| Log(te/tc) × Log(E1 × E2/Ec2) | 2.396 | 0.379 | 4.709 | 4.263 | 4.658 | 2.361 | 3.132 | 1.512 | 2.339 |
| Φ1 [1/mm] | 0.0127 | 0.0079 | 0.0043 | 0.0064 | 0.0217 | 0.0550 | 0.0112 | 0.0083 | 0.0036 |
| Φ2 [1/mm] | −0.0034 | −0.0075 | −0.0313 | −0.0047 | −0.0102 | −0.0655 | −0.0115 | −0.0267 | −0.0385 |
| Φc [1/mm] | −7.87E−06 | −6.95E−06 | −1.33E−04 | −1.41E−05 | −1.63E−04 | −2.62E−04 | −2.26E−05 | −1.25E−05 | −1.27E−04 |
| Log\|Φc/Φ1\| | −3.21 | −3.06 | −1.51 | −2.66 | −2.12 | −2.32 | −2.70 | −2.82 | −1.45 |
| Log\|Φc/Φ2\| | −2.63 | −3.03 | −2.37 | −2.52 | −1.79 | −2.40 | −2.71 | −3.33 | −2.48 |
| Rc [mm] | 72.893 | −190.970 | −16.461 | 58.049 | −37.778 | 18.130 | −37.429 | −17.295 | −46.101 |
| Dc [mm] | 65.00 | 78.40 | 25.50 | 49.00 | 42.00 | 8.50 | 40.00 | 28.00 | 34.42 |
| (te/tc)/{1 − 0.6(Dc/2Rc)2} | 2.27 | 1.54 | 6.25 | 3.36 | 12.28 | 2.07 | 3.02 | 2.57 | 5.46 |

Table 2 lists property values of the bonding member according to each exemplary embodiment.

TABLE 2

|  | E[GPa] | α[1E−07/° C.] |
|---|---|---|
| EP-001K | 0.003 | 1500 |
| EP-160 | 0.414 | 650 |
| LCR0628A | 0.010 | 1500 |
| TB3114 | 7.900 | 770 |
| (meth)acrylic compound | 4.300 | 720 |

Next, concrete numerical data of Numerical Examples 1 to 10 corresponding to the first to tenth exemplary embodiments described above is shown. In each numerical example, however, the surface number indicates the number of the optical surface counted from the light incidence side, r indicates the curvature radius of an optical surface, and d indicates an axial distance (distance on the optical axis) between the optical surface of the surface number and the optical surface of the next surface number. Also, nd and vd indicate the refractive index and the Abbe number for a d line of a medium between the optical surface of the surface number and the optical surface of the next surface number respectively. Here, the respective refractive indexes for an F line (486.1 nm), a d line (587.6 nm), and a C line (656.3 nm) of Fraunhofer lines are denoted as nF, nd, and nC and the Abbe number vd regarding a d line is defined by the following formula (19):

$$vd = (nd-1)/(nF-nC) \quad (9)$$

BF in Numerical Example 9 shows the back focus of an optical system. In each numerical example, the unit of a length (distance) is [mm] and the unit of a viewing angle is [deg]. In each numerical example, * (asterisk) is attached to the end of the surface number of an optical surface in an $$x = \frac{h^2/r}{1 + \sqrt{1 - (1+k)(h/r)^2}} + Bh^4 + Ch^6 + Dh^8 + Eh^{10} + \ldots \quad (20)$$

Numerical Example 1

| Surface number | r | d | nd | vd | outside diameter | inside diameter |
|---|---|---|---|---|---|---|
| 1 | 146.200 | 2.60 | 1.49700 | 81.5 | 68.00 | |
| 2 | 72.937 | 0.010 | 1.50000 | 45.0 | 68.00 | 65.00 |
| 3 | 72.850 | 9.80 | 1.83400 | 37.2 | 65.00 | |
| 4 | −618.800 | | | | 65.00 | |

Various kinds of data

| Focal length | 107.76 |
|---|---|

Lens unit data

| Group | start surface | focal length | lens configuration length | front-side principal point position | rear-side principal point position |
|---|---|---|---|---|---|
| 1 | 1 | 107.76 | 12.41 | 1.89 | −5.24 |

-continued

Single-lens data

| Lens | start surface | focal length |
|---|---|---|
| 1 | 1 | −296.35 |
| 2 | 2 | −127014.99 |
| 3 | 3 | 78.66 |

Numerical Example 2

| Surface number | r | d | nd | vd | outside diameter |
|---|---|---|---|---|---|
| 1 | 90.600 | 14.85 | 1.49700 | 81.5 | 78.40 |
| 2 | −190.740 | 0.020 | 1.56000 | 34.0 | 78.40 |
| 3 | 191.200 | 3.90 | 1.77250 | 49.6 | 78.40 |
| 4 | 223.400 | | | | 78.40 |

Various kinds of data

| Focal length | 1130.81 |
|---|---|

Lens unit data

| Group | start surface | focal length | lens configuration length | front-side principal point position | rear-side principal point position |
|---|---|---|---|---|---|
| 1 | 1 | 1130.81 | 18.77 | −63.75 | −71.87 |

Single-lens data

| Lens | start surface | focal length |
|---|---|---|
| 1 | 1 | 125.79 |
| 2 | 2 | −143818.76 |
| 3 | 3 | −132.82 |

Numerical Example 3

| Surface number | r | d | nd | vd | outside diameter | inside diameter |
|---|---|---|---|---|---|---|
| 1 | −18.220 | 3.70 | 1.43875 | 94.9 | 25.50 | |
| 2 | −16.423 | 0.015 | 1.50000 | 45.0 | 25.50 | |
| 3 | −16.500 | 1.65 | 1.84666 | 23.8 | 30.00 | 25.50 |
| 4 | −44.300 | | | | 30.00 | |

Various kinds of data

| Focal length | −34.25 |
|---|---|

Lens unit data

| Group | start surface | focal length | lens configuration length | front-side principal point position | rear-side principal point position |
|---|---|---|---|---|---|
| 1 | 1 | −34.25 | 5.37 | −0.13 | −3.67 |

Single-lens data

| Lens | start surface | focal length |
|---|---|---|
| 1 | 1 | 233.14 |
| 2 | 2 | −7527.21 |
| 3 | 3 | −31.92 |

Numerical Example 4

| Surface number | r | d | nd | vd | outside diameter | inside diameter |
|---|---|---|---|---|---|---|
| 1 | 94.500 | 2.00 | 1.72825 | 28.5 | 52.00 | |
| 2 | 58.097 | 0.005 | 1.50000 | 38.0 | 52.00 | 49.00 |
| 3 | 58.000 | 6.00 | 1.43387 | 95.1 | 49.00 | |
| 4 | 400.000 | | | | 49.00 | |

Various kinds of data

| Focal length | 617.36 |
|---|---|

Lens unit data

| Group | start surface | focal length | lens configuration length | front-side principal point position | rear-side principal point position |
|---|---|---|---|---|---|
| 1 | 1 | 617.36 | 8.00 | −7.22 | −12.44 |

Single-lens data

| Lens | start surface | focal length |
|---|---|---|
| 1 | 1 | −212.00 |
| 2 | 2 | −70691.45 |
| 3 | 3 | 155.53 |

Numerical Example 5

| Surface number | r | d | nd | vd | outside diameter |
|---|---|---|---|---|---|
| 1 | 90.900 | 10.50 | 1.59522 | 67.7 | 42.00 |
| 2 | −37.557 | 0.010 | 1.53000 | 36.0 | 42.00 |
| 3 | −38.000 | 1.80 | 1.73800 | 32.3 | 42.00 |
| 4 | −81.400 | | | | 42.00 |

Various kinds of data

| Focal length | 86.06 |
|---|---|

Lens unit data

| Group | start surface | focal length | lens configuration length | front-side principal point position | rear-side principal point position |
|---|---|---|---|---|---|
| 1 | 1 | 86.06 | 12.31 | 3.85 | −3.98 |

Single-lens data

| Lens | start surface | focal length |
|---|---|---|
| 1 | 1 | 46.05 |
| 2 | 2 | −6126.38 |
| 3 | 3 | −98.31 |

Numerical Example 6

| Surface number | r | d | nd | vd | outside diameter |
|---|---|---|---|---|---|
| 1 | −45.548 | 0.90 | 1.84666 | 23.8 | 8.50 |
| 2 | 18.217 | 0.005 | 1.50000 | 45.0 | 8.50 |

| | | | | | |
|---|---|---|---|---|---|
| 3 | 18.043 | 2.85 | 1.49700 | 81.5 | 10.50 |
| 4 | −17.125 | | | | 10.50 |

Various kinds of data

| | |
|---|---|
| Focal length | −152.15 |

Lens unit data

| Group | start surface | focal length | lens configuration length | front-side principal point position | rear-side principal point position |
|---|---|---|---|---|---|
| 1 | 1 | −152.15 | 3.75 | −9.23 | −12.39 |

Single-lens data

| Lens | start surface | focal length |
|---|---|---|
| 1 | 1 | −15.27 |
| 2 | 2 | −3814.58 |
| 3 | 3 | 18.17 |

Numerical Example 7

| Surface number | r | d | nd | vd | outside diameter |
|---|---|---|---|---|---|
| 1 | −1091.422 | 7.15 | 1.43387 | 95.1 | 40.00 |
| 2 | −37.396 | 0.008 | 1.50000 | 45.0 | 40.00 |
| 3 | −37.462 | 1.80 | 1.67300 | 38.1 | 40.00 |
| 4 | −105.779 | | | | 40.00 |

Various kinds of data

| | |
|---|---|
| Focal length | −2666.07 |

Lens unit data

| Group | start surface | focal length | lens configuration length | front-side principal point position | rear-side principal point position |
|---|---|---|---|---|---|
| 1 | 1 | −2666.07 | 8.96 | −18.54 | −24.81 |

Single-lens data

| Lens | start surface | focal length |
|---|---|---|
| 1 | 1 | 89.07 |
| 2 | 2 | −44239.86 |
| 3 | 3 | −87.11 |

Numerical Example 8

| Surface number | r | d | nd | vd | outside diameter | inside diameter |
|---|---|---|---|---|---|---|
| 1 | −22.300 | 4.25 | 1.49700 | 81.5 | 28.00 | |
| 2 | −17.289 | 0.016 | 1.50000 | 45.0 | 28.00 | |
| 3 | −17.302 | 1.50 | 1.69895 | 30.1 | 31.50 | 28.00 |
| 4 | −52.827 | | | | 31.50 | |

Various kinds of data

| | |
|---|---|
| Focal length | −49.45 |

Lens unit data

| Group | start surface | focal length | lens configuration length | front-side principal point position | rear-side principal point position |
|---|---|---|---|---|---|
| 1 | 1 | −49.45 | 5.76 | −0.82 | −4.65 |

Single-lens data

| Lens | start surface | focal length |
|---|---|---|
| 1 | 1 | 120.79 |
| 2 | 2 | −80069.3 |
| 3 | 3 | −37.46 |

Numerical Example 9

| Surface number | r | d | nd | vd | effective diameter |
|---|---|---|---|---|---|
| 1 | 80.638 | 3.65 | 1.58313 | 59.4 | 53.07 |
| 2* | 27.990 | 10.97 | | | 43.83 |
| 3 | −300.298 | 2.00 | 1.48749 | 70.2 | 43.56 |
| 4 | 47.192 | 3.85 | | | 41.11 |
| 5 | 191.015 | 4.60 | 1.91082 | 35.3 | 41.10 |
| 6 | −97.757 | 3.90 | | | 40.94 |
| 7 | −45.409 | 1.84 | 1.59270 | 35.3 | 39.98 |
| 8 | 122.533 | 2.85 | | | 39.97 |
| 9 | 61.121 | 8.00 | 1.88300 | 40.8 | 40.89 |
| 10 | −78.649 | 0.15 | | | 40.47 |
| 11 | −1091.422 | 7.15 | 1.43387 | 95.1 | 37.60 |
| 12 | −37.396 | 0.008 | 1.50000 | 45.0 | 37.30 |
| 13 | −37.462 | 1.80 | 1.67300 | 38.1 | 37.30 |
| 14 | −105.779 | 7.25 | | | 37.58 |
| 15 | 41.729 | 5.51 | 1.91082 | 35.3 | 35.62 |
| 16 | 8447.144 | 0.60 | | | 34.82 |
| 17 | 154.585 | 4.40 | 1.59349 | 67.0 | 33.23 |
| 18 | −65.857 | 1.56 | 1.73800 | 32.3 | 32.13 |
| 19 | 29.779 | 5.83 | | | 27.90 |
| 20(diaphragm) | ∞ | 7.13 | | | 27.21 |
| 21 | −22.300 | 4.25 | 1.49700 | 81.5 | 26.40 |
| 22 | −17.289 | 0.016 | 1.50000 | 45.0 | 27.01 |
| 23 | −17.302 | 1.50 | 1.69895 | 30.1 | 27.02 |
| 24 | −52.827 | 0.19 | | | 30.00 |
| 25 | 93.554 | 7.40 | 1.59522 | 67.7 | 31.71 |
| 26 | −33.188 | 0.15 | | | 32.00 |
| 27* | −100.115 | 4.43 | 1.85400 | 40.4 | 32.95 |
| 28 | −41.598 | 39.01 | | | 34.34 |
| Image plane | ∞ | | | | |

Aspheric surface data

Second surface

K = 0.00000e+000 B = −1.78328e−006 C = −2.44070e−009
D = −1.84376e−012 E = 1.12712e−015 F = −9.41946e−018

Twenty-seventh surface

K = 0.00000e+000 B = −7.39047e−006 C = 1.75756e−009
D = −2.71533e−011 E = 7.65390e−014 F = −9.32642e−017

Various kinds of data

| | |
|---|---|
| Focal length | 34.31 |
| F-number | 1.45 |
| Viewing angle | 32.24 |
| Image height | 21.64 |
| Total lens length | 139.98 |
| BF | 39.01 |
| Entrance pupil position | 38.18 |
| Exit pupil position | −37.19 |

| | |
|---|---|
| Front-side principal point position | 57.04 |
| Rear-side principal point position | 4.71 |

Lens unit data

| Group | start surface | focal length | lens configuration length | front-side principal point position | rear-side principal point position |
|---|---|---|---|---|---|
| 1 | 1 | 218.61 | 50.76 | 98.65 | 107.93 |
| 2 | 15 | 363.85 | 12.07 | −64.27 | −60.66 |
| 3 | 20 | 46.36 | 25.07 | 22.78 | 7.60 |

Single-lens data

| Lens | start surface | focal length |
|---|---|---|
| 1 | 1 | −75.44 |
| 2 | 3 | −83.50 |
| 3 | 5 | 71.54 |
| 4 | 7 | −55.67 |
| 5 | 9 | 40.02 |
| 6 | 11 | 89.07 |
| 7 | 12 | −44239.86 |
| 8 | 13 | −87.11 |
| 9 | 15 | 46.03 |
| 10 | 17 | 78.40 |
| 11 | 18 | −27.60 |
| 12 | 21 | 120.79 |
| 13 | 22 | −80069.30 |
| 14 | 23 | −37.46 |
| 15 | 25 | 42.07 |
| 16 | 27 | 80.53 |

Numerical Example 10

| Surface number | r | d | nd | vd | outside diameter | inside diameter |
|---|---|---|---|---|---|---|
| 1 | 333.607 | 4.76 | 1.60311 | 60.6 | 38.50 | |
| 2 | −61.478 | 1.00 | 1.63556 | 22.73 | 38.50 | |
| 3 | −45.844 | 0.010 | 1.53000 | 36.0 | 34.42 | |
| 4 | −46.357 | 1.59 | 1.72825 | 28.5 | 34.42 | |
| 5 | 32.360 | | | | 34.42 | 28.40 |

Various kinds of data

| | |
|---|---|
| Focal length | −43.37 |

Lens unit data

| Group | start surface | focal length | lens configuration length | front-side principal point position | rear-side principal point position |
|---|---|---|---|---|---|
| 1 | 1 | −43.37 | 7.36 | 4.78 | 0.24 |

Single-lens data

| Lens | start surface | focal length |
|---|---|---|
| 1 | 1 | 86.47 |
| 2 | 2 | 276.77 |
| 3 | 3 | −7867.45 |
| 4 | 4 | −25.95 |

[Optical Apparatus]

Figure 13:
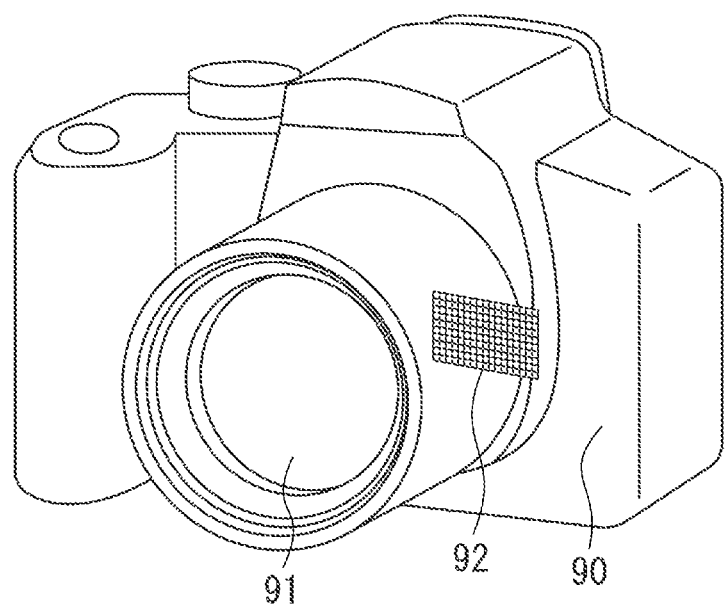
FIG. 13 is a perspective view of an optical apparatus according to an exemplary embodiment.

FIG. 13 is a schematic diagram of principal units of an image pickup apparatus (digital still camera) serving as an optical apparatus according to an exemplary embodiment. The image pickup apparatus according to the present exemplary embodiment includes a camera body 90, a photographic optical system 91 having an optical device according to any one of the above exemplary embodiments, and a light-sensitive element (image sensor) 92 that receives light from the photographic optical system 91 to make a photoelectric conversion of an object image formed by the photographic optical system 91. The photographic optical system 91 is held by a lens barrel (holding member) and connected to the camera body 90.

According to the image pickup apparatus in the present exemplary embodiment, high optical performance can be obtained by adopting an optical device according to any one of the above exemplary embodiments so that a high-quality image can be acquired. A solid-state image sensor (electronic image sensor) such as a CCD sensor or a CMOS sensor can be used as the light-sensitive element 92. In this case, an output image can be converted into a high-quality image by electrically correcting various aberrations such as distortion and chromatic aberration of an image acquired by the light-sensitive element 92.

In FIG. 13, an apparatus in which the camera body 90 and the photographic optical system 91 are integrated is illustrated as an optical apparatus according to the present exemplary embodiment, but the camera body 90 and the photographic optical system 91 may be detachably configured. That is, the photographic optical system 91 and an interchangeable lens including a lens barrel (holding member) may be configured as an optical apparatus according to the present exemplary embodiment. Also, the optical device according to each exemplary embodiment described above is not limited to application to a digital still camera as illustrated in FIG. 13 and can be applied to various optical apparatuses such as silver-halide film cameras, video cameras, telescopes, binoculars, projectors, and digital copying machines.

In the foregoing, preferred exemplary embodiments and examples have been described, but the present invention is not limited to these exemplary embodiments and examples and various combinations, modifications, and alterations can be made without deviating from the spirits thereof.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-132869, filed Jul. 4, 2016, which is hereby incorporated by reference herein in its entirety.

What is claimed is:

1. An optical device comprising:
   first and second optical elements formed of mutually different materials; and
   a bonding member bonding the first and second optical elements to each other,
   wherein the following conditional expressions are satisfied:

$0.14 < \text{Log}(te/tc) \times \text{Log}(E1 \times E2/Ec^2) < 5.0$ $-6.0 < \text{Log}|\phi c/\phi 1| < -0.30$; and $-6.0 < \text{Log}|\phi c/\phi 2| < -0.30$ where tc is a thickness in an optical axis direction of the bonding member on an optical axis, te is a thickness in the optical axis direction of the bonding member in a maximum diameter of interfaces between the first and second optical elements and the bonding member, E1, E2, and Ec are Young's moduli of the first and second optical elements and the bonding member respectively, and $\phi 1$, $\phi 2$, and $\phi c$ are refractive powers of the first and second optical elements and the bonding member respectively.

2. The optical device according to claim 1, wherein the following conditional expression is satisfied:

$$1.0 < \mathrm{Log}(E1 \times E2/Ec^2) < 20.$$

3. The optical device according to claim 1, wherein the following conditional expressions are satisfied:

$$\alpha 2 < \alpha 1; \text{ and}$$

$$0.14 \leq \mathrm{Log}(te/tc) \times (\alpha 1/\alpha 2)^{0.5} < 6.0$$

where $\alpha 1$ and $\alpha 2$ are linear expansion coefficients of the first and second optical elements respectively.

4. The optical device according to claim 1, wherein the following conditional expression is satisfied:

$$1.3 < te/tc\{1 - 0.6(Dc/2Rc)^2\} < 40$$

where Rc is an average of curvature radii of the interfaces between the first and second optical elements and the bonding member and,
Dc is the maximum diameter of the interfaces between the first and second optical elements and the bonding member.

5. The optical device according to claim 1, wherein the following conditional expression is satisfied:

$$1.2 \leq \alpha 1/\alpha 2$$

where $\alpha 1$ and $\alpha 2$ are linear expansion coefficients of the first and second optical elements respectively.

6. The optical device according to claim 1, wherein the first optical element has a convex optical surface, the second optical element has a concave optical surface, and the bonding member bonds the convex optical surface and the concave optical surface.

7. The optical device according to claim 1, wherein the first and second optical elements each are formed of an inorganic material and the bonding member is formed of an organic material.

8. The optical device according to claim 1, wherein the bonding member has negative refractive power.

9. An optical apparatus comprising:
an optical device including first and second optical elements formed of mutually different materials and a bonding member bonding the first and second optical elements to each other; and
a holding member holding the optical device,
wherein the following conditional expressions are satisfied:

$$0.14 < \mathrm{Log}(te/tc) \times \mathrm{Log}(E1 \times E2/Ec^2) < 5.0$$

$$-6.0 < \mathrm{Log}|\phi c/\phi 1| < -0.30; \text{ and}$$

$$-6.0 < \mathrm{Log}|\phi c/\phi 2| < -0.30$$

where tc is a thickness in an optical axis direction of the bonding member on an optical axis, te is a thickness in the optical axis direction of the bonding member in a maximum diameter of interfaces between the first and second optical elements and the bonding member, E1, E2, and Ec are Young's moduli of the first and second optical elements and the bonding member respectively, and $\phi 1$, $\phi 2$, and $\phi c$ are refractive powers of the first and second optical elements and the bonding member respectively.

* * * * *